(12) United States Patent
Aksak et al.

(10) Patent No.: US 12,012,981 B2
(45) Date of Patent: Jun. 18, 2024

(54) SURFACE COATING FOR REDUCTION OF AERODYNAMIC NOISE AND VIBRATIONS

(71) Applicant: TEXAS TECH UNIVERSITY SYSTEM, Lubbock, TX (US)

(72) Inventors: Burak Aksak, Lubbock, TX (US); Luciano Castillo, Carmel, IN (US); Humberto Bocanegra Evans, Lubbock, TX (US)

(73) Assignee: TEXAS TECH UNIVERSITY SYSTEM, Lubbock, TX (US)

( * ) Notice: Subject to any disclaimer, the term of this patent is extended or adjusted under 35 U.S.C. 154(b) by 102 days.

(21) Appl. No.: 17/067,464

(22) Filed: Oct. 9, 2020

(65) Prior Publication Data

US 2021/0102564 A1    Apr. 8, 2021

Related U.S. Application Data

(63) Continuation of application No. 16/122,794, filed on Sep. 5, 2018, now abandoned, and a continuation of
(Continued)

(51) Int. Cl.
*F15D 1/00* (2006.01)
*B64C 21/10* (2006.01)

(52) U.S. Cl.
CPC ............ *F15D 1/0035* (2013.01); *B64C 21/10* (2013.01); *B64C 2230/26* (2013.01)

(58) Field of Classification Search
CPC ........ F15D 1/003; F15D 1/0035; F15D 1/004; F15D 1/0045; B64C 21/10; B64C 2230/14
See application file for complete search history.

(56) References Cited

U.S. PATENT DOCUMENTS

| 2,899,150 A | * | 8/1959 | Ellis | ......................... B64C 21/10 244/130 |
| 4,736,912 A | * | 4/1988 | Loebert | ..................... B63B 1/34 114/67 R |

(Continued)

FOREIGN PATENT DOCUMENTS

RU    2518994 C1 *  6/2014    ............. B63B 1/322

OTHER PUBLICATIONS

"Biofouling"; https://en.wikipedia.org/wiki/Biofouling, Downloaded Aug. 29, 2018.

(Continued)

*Primary Examiner* — Michael H Wang
(74) *Attorney, Agent, or Firm* — LOZA & LOZA, LLP; Richard H. Krukar

(57) ABSTRACT

A coating apparatus for the reduction of aerodynamic noise and vibrations. The coating apparatus is configured to include a group of fibrillar structures, wherein each fibrillar structure is configured with a diverging tip so that the coating reduces the size of and shifts downstream, a separation bubble, and modulates large-scale recirculating motion. Each fibrillar structure can be configured as a cylindrical micropillar. The group of fibrillar structures can be configured as a group of uniformly distributed cylindrical micropillars (e.g., one or more micropillar arrays). The surface coating is effective in reducing the separation bubble and displacing the separation bubble downstream. The coating facilitates a reduction in noise (e.g., aerodynamic noise) and vibrations due to the reduction in the size of the separation bubble.

1 Claim, 17 Drawing Sheets

Related U.S. Application Data application No. 14/774,767, filed as application No. PCT/US2014/024409 on Mar. 12, 2014, now Pat. No. 10,830,261.

(60) Provisional application No. 61/777,258, filed on Mar. 12, 2013.

(56) References Cited

U.S. PATENT DOCUMENTS

| | | | | |
|---|---|---|---|---|
| 6,045,869 | A * | 4/2000 | Gesser | C09D 5/1668 427/393.6 |
| 6,050,523 | A * | 4/2000 | Kraenzien | B64C 9/00 244/130 |
| 7,318,619 | B2 * | 1/2008 | Munro | H01Q 1/005 296/180.1 |
| 7,455,021 | B2 * | 11/2008 | Kornblit | B63B 1/34 114/67 R |
| 7,842,738 | B2 | 11/2010 | Milligan et al. | |
| 8,142,700 | B2 | 3/2012 | Sitti et al. | |
| 8,206,631 | B1 | 6/2012 | Sitti et al. | |
| 8,556,215 | B1 * | 10/2013 | Schmidt | B64C 21/10 244/91 |
| 8,715,770 | B2 | 5/2014 | Selvam et al. | |
| 8,794,574 | B2 * | 8/2014 | Lang | F15D 1/0045 244/200.1 |
| 9,340,708 | B2 | 6/2016 | Sitti et al. | |
| 9,416,331 | B2 | 8/2016 | Bucher et al. | |
| 9,566,722 | B2 | 2/2017 | Sitti et al. | |
| 9,683,167 | B2 | 6/2017 | Nguyen et al. | |
| 9,732,416 | B1 | 8/2017 | Stephens et al. | |
| 9,790,640 | B2 | 10/2017 | Selwyn | |
| 9,827,735 | B2 * | 11/2017 | Schmidt | F01D 5/288 |
| 9,868,135 | B2 * | 1/2018 | Williams | B29C 48/154 |
| 2011/0117321 | A1 | 5/2011 | Menon et al. | |
| 2013/0251937 | A1 | 9/2013 | Sitti et al. | |
| 2015/0072110 | A1 | 3/2015 | Sitti et al. | |
| 2015/0368519 | A1 * | 12/2015 | Sitti | D01D 5/20 428/399 |
| 2016/0017902 | A1 * | 1/2016 | Castillo | B63B 1/36 428/92 |
| 2016/0257857 | A1 | 9/2016 | Sitti et al. | |

OTHER PUBLICATIONS

Dennis S. Petersen, Thomas Kleinteich, Stanislav N. Gorb and Lars Heepe; "Competing with barnacle cement: wetting resistance of a re-entrant surface reduces underwater adhesion of barnacles"; J. R. Soc. Interface 15: 20180396. http://dx.doi.org/10.1098/rsif.2018.0396.

* cited by examiner

SURFACE COATING FOR REDUCTION OF AERODYNAMIC NOISE AND VIBRATIONS

CROSS REFERENCE TO RELATED APPLICATIONS

This patent application is a continuation of U.S. patent application Ser. No. 14/774,767 filed Sep. 11, 2015 and titled "FIBRILLAR STRUCTURES TO REDUCE VISCOUS DRAG ON AERODYNAMIC AND HYDRODYNAMIC WALL SURFACES", and is also a continuation of U.S. patent application Ser. No. 16/122,794 filed Sep. 5, 2018 and titled "SURFACE COATING FOR REDUCTION OF AERODYNAMIC NOISE AND VIBRATIONS". U.S. patent application Ser. No. 14/774,767 claims the priority and benefit of PCT/US14/24409 filed Mar. 12, 2014 and titled "FIBRILLAR STRUCTURES TO REDUCE VISCOUS DRAG ON AERODYNAMIC AND HYDRODYNAMIC WALL SURFACES", and of U.S. provisional patent application 61/777,258 filed Mar. 12, 2103 and titled "FIBRILLAR STRUCTURES TO REDUCE VISCOUS DRAG ON AERODYNAMIC AND HYDRODYNAMIC WALL SURFACES". PCT/US14/24409 claims the priority and benefit of U.S. provisional patent application 61/777,258. U.S. patent application Ser. Nos. 14/774,767 and 16/122,794 are herein incorporated by reference in their entireties.

STATEMENT OF GOVERNMENT RIGHTS

The invention described in this patent application was made with Government support under Contract Number NSF/ONR CBET-1512393 awarded by the Office of Naval Research and the National Science Foundation. The Government has certain rights in the invention.

TECHNICAL FIELD

Embodiments are related to the fields of aerodynamics, hydrodynamics flow separation in fluid mechanics and devices, systems and techniques for reducing flow separation. Embodiments also relate to surface coatings for reducing the amount of drag produced in turbulent flow. Embodiments further relate to surface coatings that facilitate the reduction of aerodynamic noise and vibrations. Embodiments additionally relate to fibrillar structures to reduce viscous drag on aerodynamic and hydrodynamic wall surfaces.

BACKGROUND

Flow separation is a fluid mechanic phenomenon that results in increased drag and loading on structures, causing reduced energy efficiency and possibly compromising structural integrity. As an object travels through a fluid, the velocity of the fluid in contact with the object slows down because of the viscosity of the fluid and the friction applied by the object's surface. This interaction between the fluid and the surface of the object is referred to as the boundary layer, which can be categorized as either laminar or turbulent flow by calculating the Reynolds number (i.e., a ratio of inertial force to viscous force). Low Reynolds numbers are attributed to larger viscous forces, which result in laminar flow (e.g., constant, orderly fluid motion). As the Reynolds number increases because of large inertial forces, the flow becomes disorderly (e.g., producing eddies and vortices) and transitions into turbulent flow.

With respect to aerodynamics, the boundary layer profile begins as laminar and transitions to turbulent as the velocity profile thickens—disrupting the smooth flow and producing skin-friction drag. At greater downstream distances of an object traveling through a fluid, the boundary layer and the pressure differential (e.g., front-to-back of object) increase—eventually resulting in a separation bubble that reverses the flow at the surface. When the flow reverses, the boundary layer essentially separates from the surface, creating a drag force that requires more energy to overcome and in some cases causes a plane to stall.

In addition to turbulent flow, an object's surface roughness has demonstrated an ability to increase the skin-friction drag and potentially play a role in flow separation. To overcome this issue, researchers have been investigating the use of coating on surfaces to reduce the amount of drag produced in turbulent flow.

Micro- and/or nano-fibrillar structures exist in a variety of naturally-occurring biological systems, such as gecko foot pads and lotus leaves, where these patterns promote adhesion and self-cleaning, respectively (Aksak et al. Langmiur 2007). Recent attention has been made on understanding the purpose and effects of such biological micro- and/or nano-structures, as well as methods to fabricate similar synthetic structures using micro/nano-fabrication techniques. For example, there have been many recent studies on shark-skin inspired micro-structures.

Drag reduction on aerodynamic and hydrodynamic surfaces consists of reducing viscous skin friction, delaying flow separation and boundary layer relaminarization by external means. Passive techniques, such as applying surface roughness, riblets, and/or additives, are simple and easy to apply without additional requirement of external power and complicated control schemes. Substantial prior research on the subject has already demonstrated that by manipulating the surface characteristics, i.e. surface roughness, chemistry, and wall compliance, and by altering near wall fluids property like effective viscosity, one can impact the genesis, growth and dissipation of near wall coherent structures which correlate strongly with high wall shear stress events (Sheng et. al, JFM 2008, Hong and Katz, J F M 2012). Recent studies using flow control techniques such as near wall Lorenze force, synthetic jets, and active surfaces aiming at manipulating the buffer layer dynamics and consequently controlling the population of near wall coherent structures, show success in identifying the mechanisms at laboratory scales. Impaired by manufacturing cost and difficulty in scaling to large-scale applications, these techniques have not resulted in widely-adopted commercial products.

One of the methods to increase the efficiency of wind turbines, ground and aerospace transportation systems, wall-bounded flows such as pipe flows (including oil transport in petroleum applications), and under water bodies (e.g. submarines) relies on reducing viscous drag. Free-stream turbulence and turbulence within the boundary layer generated after the flow that comes in contact with a surface result in increased viscous drag. Additional increase in roughness through mosquitos and dust sticking to the surfaces further increase viscous drag and reduce efficiency in wind turbine applications.

Riblets, a shark-skin inspired technology, have been used extensively to reduce drag particularly for airfoils applications. Riblets are micro-grooves on the surface of the airfoil that are in-line with the free stream flow direction. A turbulent boundary layer (i.e. a very thin region near the wall where viscous forces are important) could be hydraulically smooth (i.e. nearly smooth) at low Reynolds numbers, but may become rough at high Reynolds numbers. This is because as the boundary layer becomes thinner with increasing Reynolds number (or speed), the ratio of the roughness height to the viscous length scale becomes very large. Therefore, the outer flow, which is about 90% of the flow, becomes more sensitive to changes in the wall conditions. This is a crucial problem in submarines and ships where the Reynolds number is large and proper value of the skin friction (viscous drag) as a function of the roughness parameter is crucial. Drag reduction of up to 10% has been reported for airfoils with riblets on its surface [1].

As a result, there is a need for a passive technology that results in a drag reduction greater than the 10% reduction observed for riblets on aerodynamic and hydrodynamic wall structures.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is therefore one aspect of the disclosed embodiments to provide for methods and devices for reducing flow separation.

It is another aspect of the disclosed embodiments to provide for methods and devices that reduce the amount of drag produced in a turbulent flow.

It is yet another aspect of the disclosed embodiments to provide for a surface coating for the reduction of noise and vibrations due to a reduction in the size of a separation bubble.

It is also an aspect of the disclosed embodiments to provide for a micro-scale fibrillar coating that reduces flow separation by reducing the size of a separation bubble and pushing the separation point further downstream.

The aforementioned aspects and other objectives and advantages can now be achieved as described herein. A surface coating is disclosed for the reduction of aerodynamic noise and vibrations. In an example embodiment, a coating apparatus can be configured, which includes a group of fibrillar structures, wherein each fibrillar structure is configured with a diverging tip so that the coating reduces the size of and shifts downstream, a separation bubble, and modulates large-scale recirulating motion. In some example embodiments, each fibrillar structure can be configured as a cylindrical micropillar. Such a group of fibrillar structures can be configured as a group of uniformly distributed cylindrical micropillars.

The coating is configured to function under dry or wet conditions and mitigates flow separation without a noticeable increase in the production of TKE (Turblent Kinetic Energy). The coating can be configured as a microsurface coating that shifts the separation point downstream and reduces the area of negative flow. The coating can also be configured to rely on the generation of disributed wall-normal perturbations.

The present invention provides a passive structure that results in a drag reduction greater than the 10% reduction observed for riblets on aerodynamic and hydrodynamic wall structures by modifying the surface of the wall structure with micro-fibers that modify the coherent structures in the inner flow.

More specifically, the present invention provides an aerodynamic or hydrodynamic wall surface having an array of fibrillar structures disposed on and extending from the wall surface, wherein each fibrillar structure comprises a stalk and a tip. The stalk has a first end and a second end, wherein the first end is attached to the wall surface, and the stalk is oriented with respect to the wall surface at a stalk angle between approximately 1 degree and 90 degrees. The tip has a first side and a second side, wherein the first side is attached proximate to the second end of the stalk, the tip has a larger cross-sectional area than the stalk, and the second side comprises a substantially planar surface that is oriented with respect to the stalk at a tip angle between approximately 0 degrees and 90 degrees.

The present invention is described in detail below with reference to the accompanying drawings.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the disclosed embodiments, serve to explain the principles of the present invention.

DETAILED DESCRIPTION

Figure 1:
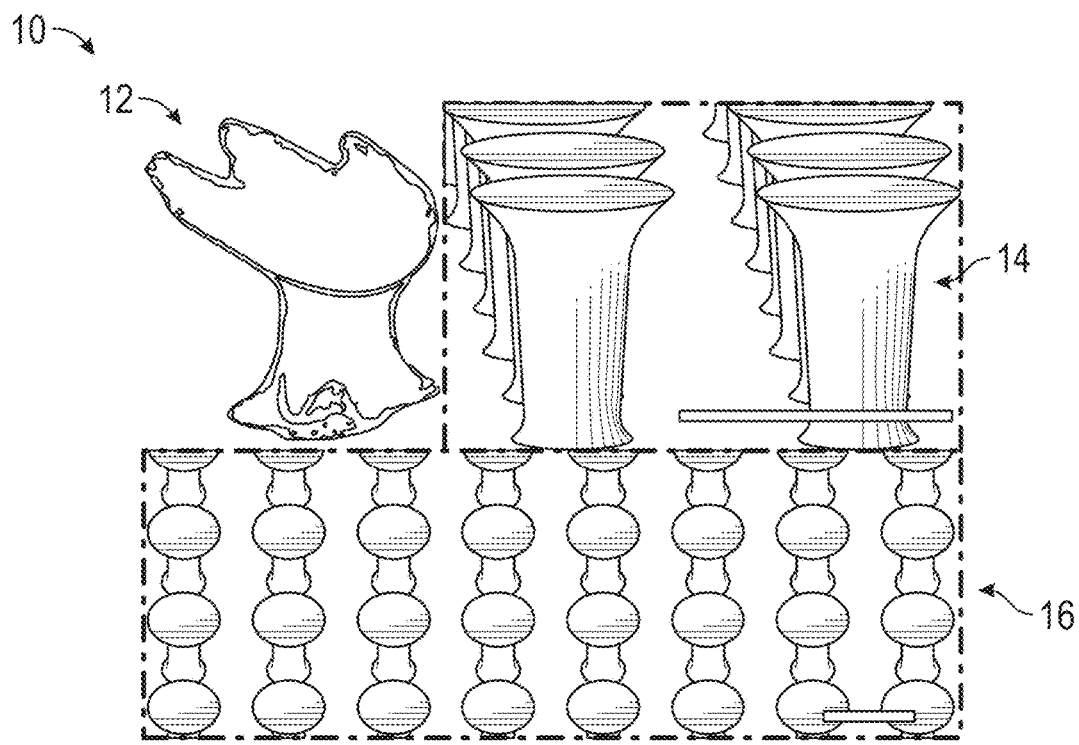
FIG. 1 illustrates a pictorial diagram depicting a sample shark denticle and sample microscopy images of micropillar arrays, in accordance with an example embodiment.

The particular values and configurations discussed in these non-limiting examples can be varied and are cited merely to illustrate at least one embodiment and are not intended to limit the scope thereof.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to airfoils, but it will be understood that the concepts of the present invention are applicable to any aerodynamic or hydrodynamic wall surface.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to identical, like or similar elements throughout, although such numbers may be referenced in the context of different embodiments. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "an example embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

During the past few decades, considerable effort has been placed on controlling flow separation. This phenomenon is usually responsible for increased vibration and drag on bluff bodies as well as higher energy consumption in vehicles. The drag experienced by a body under subsonic motion mostly embodies viscous and pressure (form) effects. The former is a result of friction induced by the near-wall fluid, and the latter is a result of pressure imbalance around the surface of the body. The separation phenomenon is well exemplified in the canonic case of flow around a foil at a sufficiently high angle of attack. There, the adverse pressure gradient (APG) in the suction side leads to flow deceleration and eventually flow detachment. The direct consequence of this process is a change of the aerodynamic force components, namely lift and drag.

Surface roughness plays a significant role in the turbulence dynamics near the wall and, in particular, in the separation regions. Evidence suggests that randomly distributed roughness, e.g., sand grain roughness, may move the separation point against the flow direction in the case of foils; this shift results in drag increase and lift decrease. Experiments have shown an upstream shift of the separation point in a channel expansion with rough walls. However, various studies have shown that triggering transition to turbulence may reduce separation. These findings have motivated the use of flow control strategies such as vortex generators and synthetic jets to effectively delay flow separation. Unfortunately, these methods increase the production of TKE (Turbulent Kinetic Energy), which, in turn, increases viscous losses and thus energy dissipation near the wall region. This viscous loss suggests that the control of flow separation without turbulence penalty is an ideal way to control form drag.

Recent efforts have focused on passive control via bio-inspired surfaces. The morphology of some natural organisms such as the lotus leaf and shark skin suggests that this daunting task might be achieved through textured coatings. Synthetic microscale structures similar to those found in the lotus leaf have been effective in reducing viscous drag by creating a slip velocity with trapped air between the wall and the water flow. The surface, however, eventually wets, losing functionality over tim. Denticles found on the skin of sharks have also shown drag reducing properties. While not completely understood, these structures appear to inhibit the formation and evolution of near-wall coherent motions. However, the physical mechanism responsible for this phenomenon is still under debate.

FIG. 1 illustrates a pictorial diagram depicting a sample shark denticle 10 and sample microscopy images 14 and 16 of micropillar arrays, in accordance with an example embodiment. The example shark denticle 10 shown in FIG. 1 demonstrates a divergent shape with an asymmetry in the wall-normal and streamwise directions. The example microscopy images 14 and 16 of such micropillar arrays have a similar asymmetric shape (e.g., note—scale bars: 100 μm). Note that in the example images 14 and 16, the height and tip diameter of each element are 85 μm and 75 μm, whereas the salk diameter is 40 μm. The center-to-center distance between the pillars is 120 μm. Note that throughout the specification, example parameters such as those depicted in the figures and described herein, should not be considered limiting features of the disclosed embodiments but are discussed and illustrated for exemplary purposes only.

A feature of shark denticles as illustrated in FIG. 1 is the aforementioned asymmetric geometry. The pillars shown in images 14 and 16, for example, are axisymmetric but take other elements of the denticles, including divergence and height. They are packed in a Cartesian layout and feature a "spatula" shape with stalk and tip diameters of 40 μm and 75 μm, respectively, a height of 85 μm (defined here as the roughness height, k), and a center-to-center distance between pillars of 120 μm. Another key difference is that the pillars do not include the channel-like indentations that denticles have on their top surfaces. Note that the pillars shown in the images 14 and 16 can be arranged in a square packing with aligned rows and columns, but naturally occurring denticles overlap and are randomly aligned. Synthetic denticles have been successfully tested in Cartesian arrays without overlap. One of the objectives of the disclosed embodiments is to demonstrate that this unique, engineered microsurface is capable of mitigating flow separation. The pillars' simple manufacturing and cost-effective fabrication process may lead to a large impact in a wide range of energy applications.

Despite some success fabricating shark-inspired synthetic surfaces, such fabrication methods rely on 3D printing, making it difficult to replicate denticles in their original size. Some experiments have scaled the structures by a factor of 12.4 to satisfactorily replicate geometric features. However, because every denticle must be 3D printed, this method may be slow and expensive. The approached described and presented herein instead relies on a series of etching and casting steps. While the initial step includes a complicated process composed of deep reactive ion etching, the subsequent steps allow for replication of the desired surface using simple casting methods. Once a mold is made, it can be used almost indefinitely. This reusability allows for reproduction and scaleup of these engineered microsurfaces in a cost-effective manner, using a variety of materials capable of satisfying application-specific requirements. Furthermore, the structures can be casted directly on the surface to be coated, thus simplifying the installation process.

Figure 2:
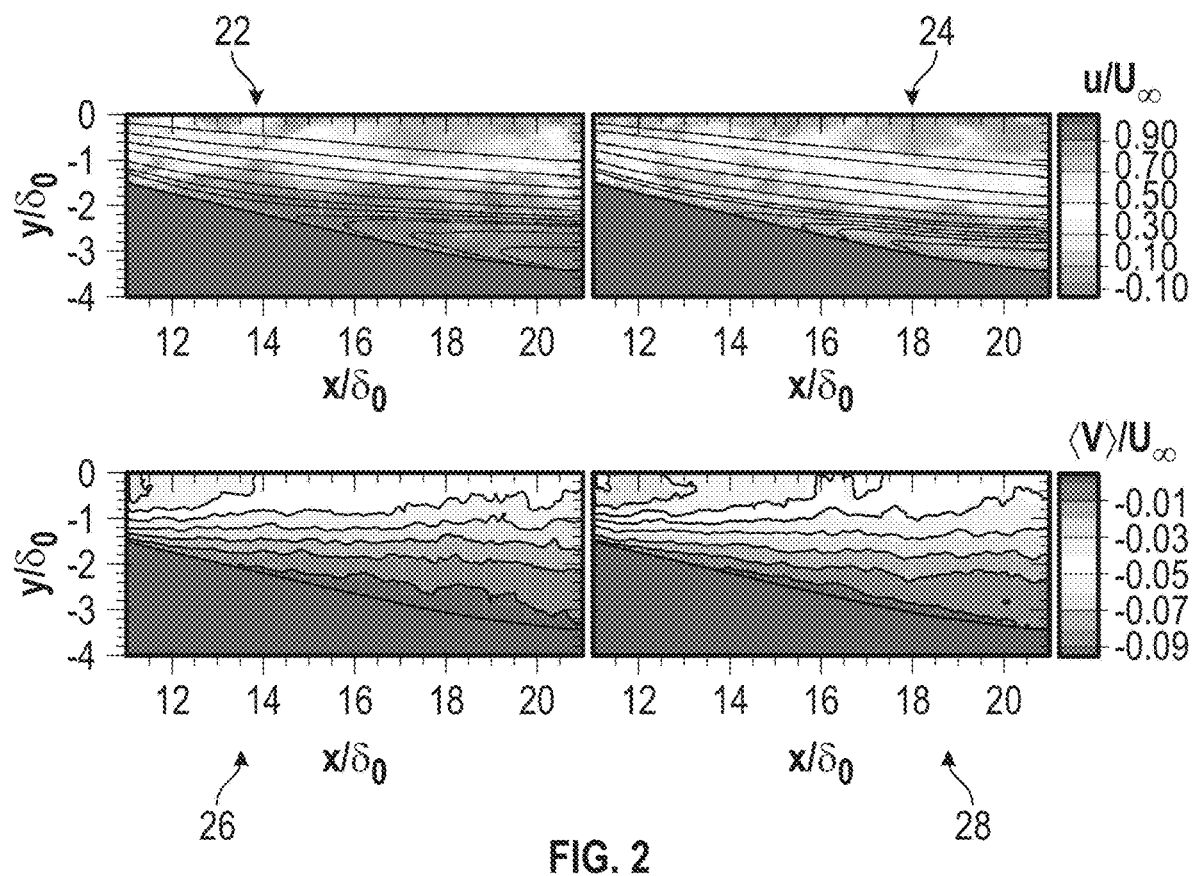
FIG. 2 illustrates graphs depicting data indicative of instantaneous normalized velocity for respective smooth and coated cases, and graphs of data indicative of the mean vertical velocity for the smooth and coated cases, respectively, in accordance with an example embodiment.

FIG. 2 illustrates graphs 22, 24 depicting data indicative of instantaneous normalized velocity $u/U_\infty$ for respective smooth and coated cases, and graphs 26 and 28 depicting data indicative of the mean vertical velocity $\langle V \rangle /U_\infty$ for the smooth and coated cases, respectively, in accordance with an example embodiment. Graphs 22 and 24 demonstrate that the smooth case has significantly more reverse flow, which is associated with separated flow. In addition, graphs 26 and 28 demonstrate the area of flow moving away from the wall (upward velocity), which is linked to separation.

The data contained in the various graphs shown herein (e.g., FIGS. 2, 3, 4) is based on measurements that were performed in a refractive-index-matching (RIM) facility at the University of Illinois at Urbana-Champaign with a diverging cross-section (e.g., see image 16 in FIG. 1) at $Re_\theta \approx 1,200$. As discussed previously, such measurements or parameters are not to be considered limiting features of the disclosed embodiments, but are provided herein for exemplary purposes only.

The RIM allowed measurement of the velocity very near the wall, down to $y^+ \approx 3.6$ for the selected interrogation window. The flow field and turbulence statistics were compared with a smooth counterpart. The calculated uncertainty of the velocity measurement is 0.5% of $U_\infty$. Details of the experiments are described in the section "Materials and Methods" herein. The resulting velocity fields reveal significant differences between the flows over the smooth and coated walls.

Instantaneous velocity contours with superimposed mean streamlines (i.e., see graphs 22 and 24 in FIG. 2) illustrate a large region with reverse flow in the smooth case. In contrast, the divergent pillars induce a smaller separation bubble. Further, the reverse flow (blue) region is considerably smaller in the coated case.

Figure 3:
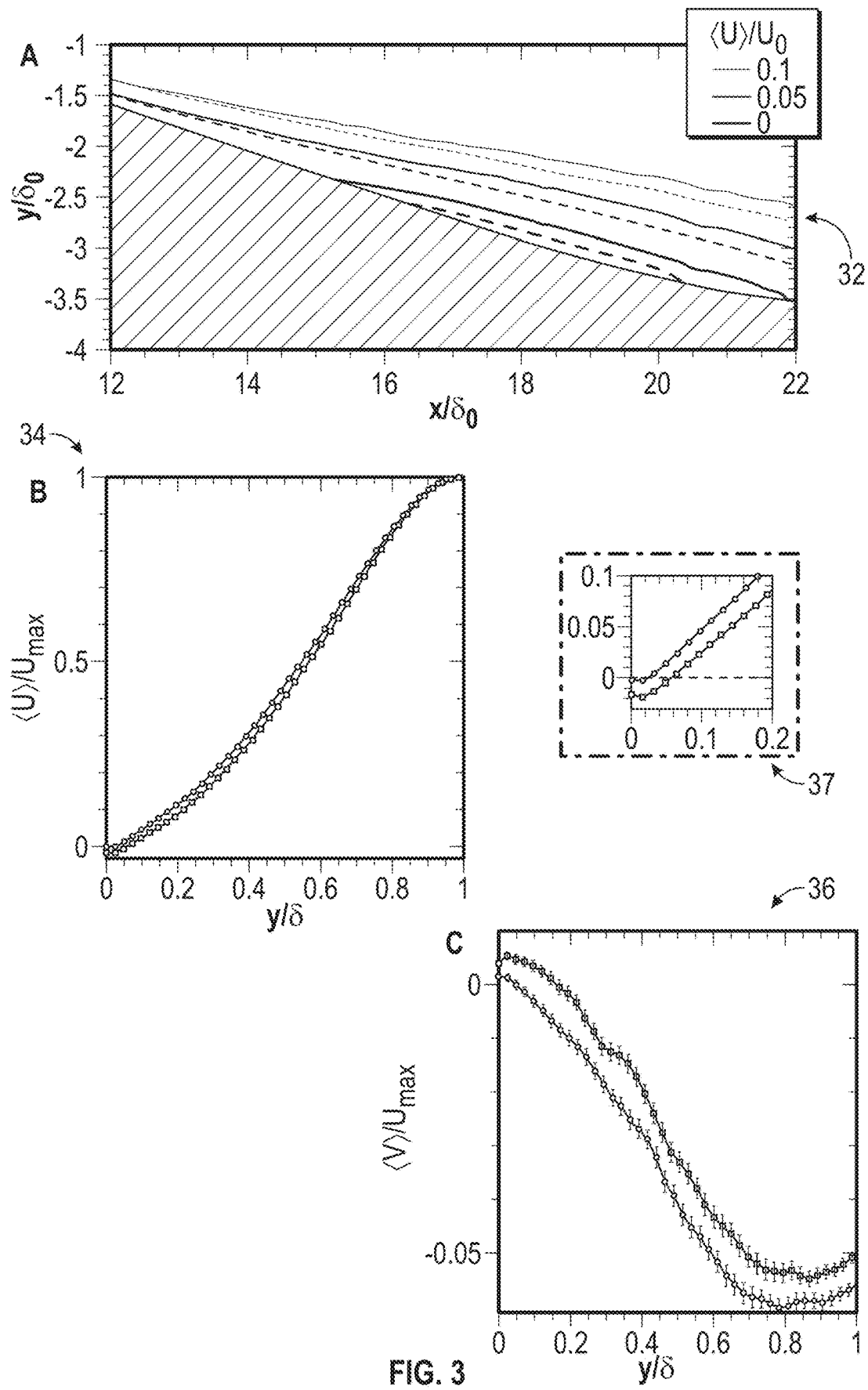
FIG. 3 illustrates a graph depicting superimposed contour lines for the normalized mean streamwise velocity and graphs with data indicative of velocity profiles, in accordance with an example embodiment.

FIG. 3 illustrates a graph 32 depicting superimposed contour lines for the normalized mean streamwise velocity $\langle U \rangle /U_\infty$ and graphs 34 and 36 with data indicative of velocity profiles, in accordance with an example embodiment. In graph 32, solid lines represent "smooth" and dashed lines represent "coated". The smooth case shown an approximately 60% larger area with negative flow (black level). Graphs 34 and 36 respectively show velocity profiles for $\langle U \rangle /U_\infty$ and $\langle V \rangle /U_\infty$, respectively, smooth and coated. Note that in graph 34, the inset 37 shows the region near the wall for $<U>/U^\infty$, where a larger negative portion in the smooth case can be observed. Error bars represent SE ($=u_{rms}/\sqrt{N}$, where N is the number of samples). For U, the error bars (not shown) are smaller than the symbol site).

The reduced flow separation is confirmed by the mean streamwise velocity contours, which are shown superimposed for both cases (see graph 32 in FIG. 3A). The contours for the smooth case (solid lines) recover farther away from the wall, and the reverse flow (black contour) is considerably larger over the smooth surface. The area with reverse flow is reduced by approximately 60% in the presence of the microscale coating. Our data also reveal a downstream shift in the separation point of $\sim 0.4\delta_0$, where $\delta_0$ is the boundary layer thickness at the inlet of the expansion. The effect of the coating is also observed in the mean vertical velocity field. When the flow is attached, this velocity component should remain negative in this particular configuration. However, as observed in some cases, a higher upward velocity occurs in the smooth case, which is characteristic evidence that the boundary layer has detached from the wall (i.e., it is separated).

Despite lift and drag measurements not being performed for this particular study, previous wind-tunnel experiments carried out on a coated S809 airfoil have shown a 25-40% increase in the lift coefficient at angles between 8° and 16°. These results provide complementary evidence of the functionality of pillars (such as shown, for example, in the images 14 and 16) in reducing flow separation. This apparent functionality (lift coefficient increase) in wind-tunnel experiments implies that the coating also works in air. This supports the hypothesis that the mechanism by which the surface coating reduces flow separation does not rely on hydrophobicity.

The differences between the two cases are highlighted in the selected mean velocity profiles at $x/\delta_0=18.5$ (see graphs 34 and 36 in FIG. 3). This is consistent with reduced blockage from a smaller recirculation bubble. The streamwise velocity in the coated case is higher near the wall (approximately 10% of the local average) than in the baseline. The effect of the coating is most noticeable from the wall up to 0.6. The inset 37 in graph 34 of FIG. 3 shows a closer view near the wall, where the area with negative velocity, i.e., below the dashed line, is larger over the smooth surface. The difference larger, reaching almost 50% increase in the coated case around $y/\delta \approx 0.3$. It is also worth noting that the vertical velocity does not recover completely at the edge of the boundary layer. This effect is due to the separation bubble preventing the flow from moving downward along the wall.

When adding texture to a wall, there is a risk of increasing the production of turbulent kinetic energy, which is related to viscous losses. The data discussed herein demonstrates differences in the TKE production between the two cases that are within the measurement uncertainty, suggesting that the pillars have minor effect on the turbulence production. This result is expected for "hydrodynamically smooth" walls.

While the results from the APG experiments show that the separation bubble is reduced and displaced downstream, the physical mechanism responsible for these phenomena is not evident from the data. To shed light on this mechanism, additional high-resolution experiments were carried out over a flat plate coated with the same engineered diverging pillars at $Re_\theta \approx 3,600$ (see details in the "Materials and Methods" section herein). For these measurements, the interrogation window was placed as close as $y^+ \approx 1$. This setup was chosen to avoid the unsteadiness of the separation bubble in the APG flow. It should be noted that given the thickness of the laser sheet (e.g., approximately 1 mm), we inherently probe the flow over several rows of pillars, which creates an averaging effect in the transverse direction.

Figure 4:
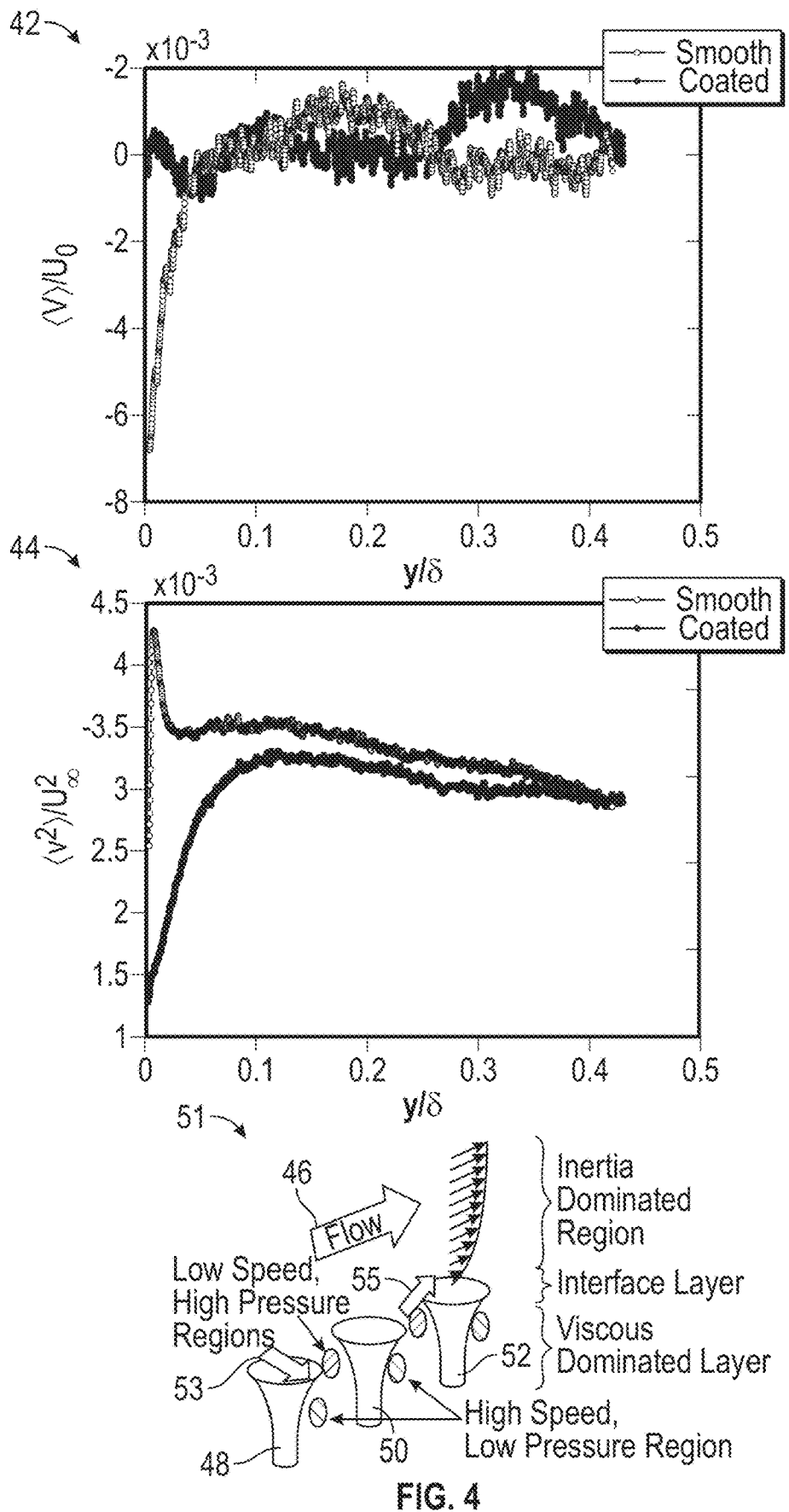
FIG. 4 illustrates graphs depicting profile data and a schematic diagram demonstrating the physical mechanism by which a group of micropillars modify the flow in the area near the flow, in accordance with an example embodiment.

FIG. 4 illustrates graphs 42 and 44 depicting profile data and a schematic diagram 51 depicting the physical mechanism by which a group of micropillars 48, 50, 52 modify the flow in the eaera near the flow, in accordance with an example embodiment. Graph 42 shown in FIG. 4 plots data indicative of a wall-normal profile over someth and coated plates at x=2,100 mm. The coated case demonstrates a negative velocity in the vicinity of the wall, which is a result of suction between pillars (e.g., such as between micropillars 48, 50, and/or 52). Graph 44 depicts data indicative of wall-normal Reynolds stress. The velocity fluctuation shows a marked increase in the eara adjacent to the pillar canopy edge, which suggests that oscillations are induced by the pillars in the flow in the interface of the pillary canpy.

The schematic diagram 51 illustrates the physical mechanism by which the micropillars modify the flow in the area near the flow. Note that in the schematic diagram 51, flow is indicated by the arrow 46. That is, areas of low and high pressure create high- and low-velocity areas, respectively. They also create ejection and suction events as represented by the thick black arrows 53 and 55 shown in FIG. 4, which increase the wall-normal velocity fluctuations. The schematic diagram 51 also demonstrates three distinct regions that arise in the flow: an inertia-dominated region, a viscous-dominated region, and an interface region between these two layers.

The vertical velocity profile (see graph 42 in FIG. 4) for the coated case shows a downward (negative) flow near the wall. The inventors believe that this downward flow may be due to a misalignment between the pillar rows and the bulk flow, creating a localized spanwise flow. The mechanism by which the pillars reduce flow separation can be gleaned from graph 44 in FIG. 4. The pillars generate oscillations in the inner layer, which are reflected as a large peak in the wall-normal component of the Reynolds stresses near the edge of the pillar canopy. Complementary insight is illustrated in the schematic diagram 51 of FIG. 4. The pillars reduce the crossectional area, accelerating the fluid passing between them along the streamwise direction (red area). This acceleration decreases the pressure and generates suction. Additionally, pillars 48, 50 and/or 52 create a stagnation point by blocking some of the fluid. This increases the pressure and pushes fluid up, inducing fluid ejection.

Instead of the typical nonslip condition in canonical smooth walls, at the top of the pillars (y=k), the fluid velocity is not zero between the pillars. Instead, an "interlayer" is created above the pillars (see schematic diagram 51). In this layer a connection exists between the boundary layer (flow above the pillars 48, 50, 52) and the inner flow (i.e., within the canopy). Recalling the boundary layer momentum equation in the wall-normal direction, $$\frac{1}{\rho}\frac{\partial \langle P \rangle}{\partial y} = \frac{\partial \langle v^2 \rangle}{\partial y} + \frac{\partial \langle v''^2 \rangle}{\partial y}, \qquad [1]$$

it is clear that $\langle v^2 \rangle$ and $\langle P \rangle$ are directly related; here $\langle \cdot \rangle$ represents the time-averaging operator and $\langle v^{*2} \rangle$ is a dispersive stress arising from the spatial averaging in the x (streamwise) and z (spanwise) directions. Integrating Eq. 1 from the top of the diverging pillars to a point y above the surface, it follows that $$(\langle P_{oi} \rangle - \langle P \rangle)/\rho = \langle v^2 \rangle - \langle v_{oi}^2 \rangle + \langle v''^2 \rangle - \langle v_{oi}''^2 \rangle, \quad [2]$$

where $\langle P_{oi} \rangle$ is the static pressure at the edge of the canopy; that is, $y_{oi}$=k=85 μm. Note that for the case of the smooth surface $\langle v_{oi}^2 \rangle$=0, but in the coated case $\langle v_{oi}^2 \rangle \neq 0$, as seen in the lower portion of graph 44 in FIG. 4.

The flow regime is significantly different within the micropillar layer, however. It has a $Re_k$ less than or approximately equal to 1, based on the geometry and the estimated friction velocity; thus, it is viscous dominated and governed by pressure gradient, i.e., Stokes flow. Equation 1 can be used accordingly, recognizing that the gradient of the wall-normal Reynolds stress approaches zero. Therefore, $\langle P_\omega \rangle \approx \langle P_{oi} \rangle$ within the pillar canopy, and the changes in the wall-normal Reynolds stress are proportional to the pressure difference between the static pressure at the wall, $\langle P_\omega \rangle$, and the local pressure across the boundary layer. Consequently, it follows that $$\langle v_{oi}^2 \rangle = \langle v^2 \rangle + \langle v''^2 \rangle - \langle v''_{oi}{}^2 \rangle - (\langle P_\omega \rangle - \langle P \rangle)/\rho. \quad [3]$$

This relation implies that the changes observed in the inner region for $\langle v^2 \rangle$ are likely due to suction and blowing events between the diverging pillars and along the high-momentum flow region. Despite the fact that these changes exist mainly below the buffer layer, significant variations are observed in the outer layer, where the bubble resides. Consequently, this microscale surface passively modulates the small scales of the flow in the wall region, which in turn affects the large scales in the outer flow. Given the size of the pillars, this result is surprising, but is consistent with observed findings of the propagation of the pressure perturbation over 35 times the pillar height.

The pressure modulation generated by the pillars can be described as small-scale weak jetting events that may reenergize the boundary layer and delay separation; however, the pillars passively induce small-scale perturbations over the entire surface. In the case of the divergent pillars, the contraction in the cross-sectional area is greater, amplifying the flow acceleration between the pillars. The regions of ejections and suctions are increased in the viscous sublayer. For the smooth case, this increase occurs in the buffer layer, suggesting evidence of an interlayer above the pillar, which is consistent with Equation 3.

The combined results from such experiments indicate that it is through pressure changes at the interlayer, between viscous-dominated flow within the canopy and the inertia-dominated flow above the pillars, that the large scales of the flow are affected. Thus, the wall normal Reynolds stress at the interface, $\langle v^2 \rangle$, modulates the flow between the diverging pillars (suction and blowing) by interacting with the pressure difference, $\langle P_\omega \rangle - \langle P \rangle$, across the roughness interlayer. It must be stressed that the diameter of the pillar is the largest at the interlayer between the roughness canopy and the boundary layer, and therefore its effect is largest precisely in this region of the flow.

The pillars 48, 50 and 50 shown in the schematic diagram 51 in FIG. 4 are thus examples of a type of bio-inspired fibrillar structure. They have the demonstrated the ability to reduce the drag by more than 10%. The disclosed embodiments are based on studies of the effects of such fibrillar structures on flow separation. The inventors have discovered that the micro-scale fibrillar coating significantly reduced flow separation by reducing the size of the separation bubble and pushing the separation point further downstream. The inventors have accomplished this without increasing the turbulent kinetic energy (which is by-product of texturizing a surface). These results starkly oppose the notion that rough surfaces facilitate flow separation. The configuration and makeup of the surface coating in the disclosed embodiments demonstrate how and why the surface coating is so effective in reducing the separation bubble and displacing the separation bubble downstream.

Flow separation on moving bodies has a negative effect on energy efficiency. Reducing recirculating regions is a key in the design of energy-efficient systems. Efficient design decreases fuel consumption and pollutant emissions, including the systems' carbon footprint. The engineered bio-inspired coating presented herein aims to contribute in that direction. The relative ease of manufacturing and installation and its cost effectiveness, as well as its functionality under both wet and dry conditions, make it a versatile solution of potentially high impact in a broad range of applications, including transportation, wind power, and underwater vehicles.

CONCLUSIONS AND OUTLOOK

We have tested the flow control properties of an engineered bio-inspired surface coating. Our results confirm the functionality of the coating, which mitigated flow separation without a noticeable increase in the production of the turbulent kinetic energy. The microscale surface coating shifts the separation point downstream and significantly reduces the area of negative flow. The coating can be manufactured and installed with relative ease and is cost-effective in comparison with other solutions manufactured using 3D printing. The physical mechanism by which the coating works does not rely on (super)hydrophobicity. Instead, it relies on the generation of distributed wall-normal perturbations, giving it the versatility to work in liquid and gas media. These results have important implications in flow control, with applications in both power generation, e.g., wind turbines, and energy-efficient transport vehicles. These capabilities considerably increase the potential impact of the engineered coating.

While our results demonstrate the functionality and describe the working mechanism of the micropillars, it is necessary to test the surface coating under other flow conditions and different geometric configurations, e.g., spacing and height. Adapting the micropillar coating to a diverse array of applications will maximize the impact of this engineered surface on energy and transport systems.

Materials and Methods

Figure 5:
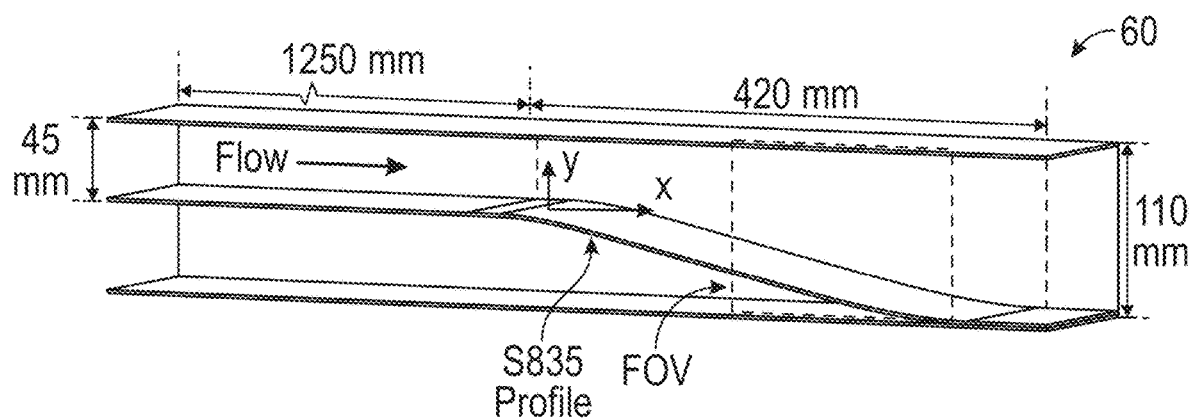
FIG. 5 illustrates a schematic diagram of the APG test section of a wind-turbine, in accordance with an example embodiment.

FIG. 5 illustrates a schematic diagram 60 of the APG test section of a wind-turbine, in accordance with an example embodiment. In the experiments associated with the schematic diagram 60, the boundary layer develops in an approach channel of height H=45 mm and a length L=1,250 mm. The origin of the coordinate system (x=0, y=0) is set at the bottom wall of the channel at the beginning of the expansion. The micropillar coating (shaded area) was applied from x=−50 mm, and the X835 section is 370 mm long.

Figure 6:
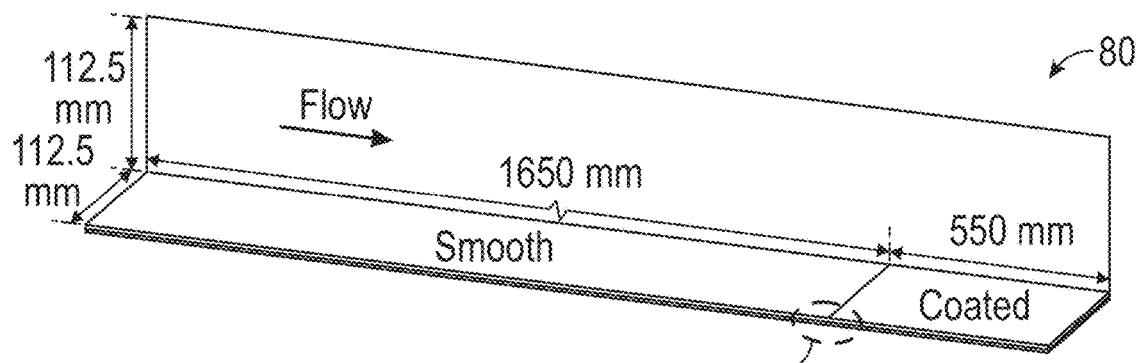
FIGS. 6 and 6A illustrate a schematic diagram depicting a ZPG test section, in accordance with an example embodiment.
Figure 6A:
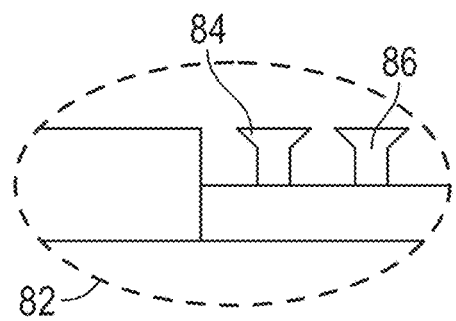

FIGS. 6 and 6A illustrate a schematic diagram 80 depicting a ZPG test section, in acordance with an example embodiment. The boundary layer develops over a smooth region of 1,650 mm followed by a coated plate of 550 mm length ($Re_\theta \approx 3,600$), using the same diverging pillar geometry (e.g., shape, size, and spacing) as in the APG experiments. Careful alignment of the plates was performed by using 20-µm shims. In FIG. 6, example pillars 84 and 86 are shown in the inset 84.

The experiments were performed in a RIM flume of a 112.5×112.5 $mm^2$ test section at the University of Illinois (laboratory of L.P.C.). The working fluid was a sodium iodide solution (63% by weight) with a kinematic viscosity $v=1.1\times10^{-6}$ $m^2/s$ and a density $\rho=1,800$ $kg/m^3$. The minimum reflection from the wall allowed measurements within the viscous sublayer ($y^+ \approx 3.6$). The facility was adapted with a diverging wall (see FIG. 5) to induce adverse pressure gradient and flow separation. The experiments were performed at a Reynolds number $Re_H=U_oH_{1/2}/v=4,600$ (or in terms of the momentum thickness, $Re_\theta \approx 560$) measured right upstream of the expansion (x=0), where U0=0.225 m/s is the centerline velocity and $H_{1/2}=H/2$. The boundary layer thickness at the inlet $\delta_0=16:2$ mm, and the normalized roughness height $k^+ \cong 1$ is estimated with $c_f=0.026/Re_x^{1/7}$. The inlet velocity profile for both cases differed by less than or equal to 1%. In the FOV (Field of View) shown in FIG. 2, for example, $\delta \approx 27.5$ mm and $Re_\theta \approx 1,200$.

Flat-plate [zero pressure gradient (ZPG)], high-resolution experiments were carried out in the RIM flume described above to assess the changes in the velocity field near the wall. For this set of experiments, the cross-section (112.5 mm×112.5 mm) was unobstructed. As illustrated in FIG. 6, the bottom wall was coated over a 550-mm span past a 1,650-mm smooth development region. The height of the coated plate was adjusted to minimize disturbances. Furthermore, to reduce misalignment effects, the flow was probed 500 mm into the coated section. The mean free stream velocity $U_\infty=0.8$ m/s, equivalent to a momentum-based Reynolds number $Re_\theta=3,600$. For these experiments, the field of view was considerably smaller than in the APG experiments, allowing us to resolve the viscous sublayer, down to a $y^+ \approx 1$.

Regarding particle image velocimetry, planar (two-dimension, two-component) particle image velocimetry (PIV) was used to measure the velocity field in a vertical plane at the axis of the diverging flume. An 11-MP camera (e.g., 2,700×4,000 $pixels^2$) and a pulsed, dual-head Nd:YAG laser were used for image capture. The APG experiments had a resolution of 46 µm/pixel, resulting in a field of view of approximately 182×123 $mm^2$. Each experimental run involved 4,000 PIV realizations. The data processing was performed with a final interrogation window of 16×16 $pixels^2$ with 50% overlap, resulting in a vector separation $\Delta x=\Delta y=365$ µm.

The ZPG experiments used the same imaging system described above, but with higher resolution and a different processing algorithm. The optical field of view for these experiments was 26 mm×17.4 mm. A PIV plus PTV (particle tracking velocimetry) processing (LaVision) was used to obtain the velocity field. The algorithm performed two PIV passes, 32×32 pixels and 16×16 pixels, with a final PTV pass. The mean velocity field was calculated from 2,000 samples with a vector separation of 6.5 µm.

Figure 7:
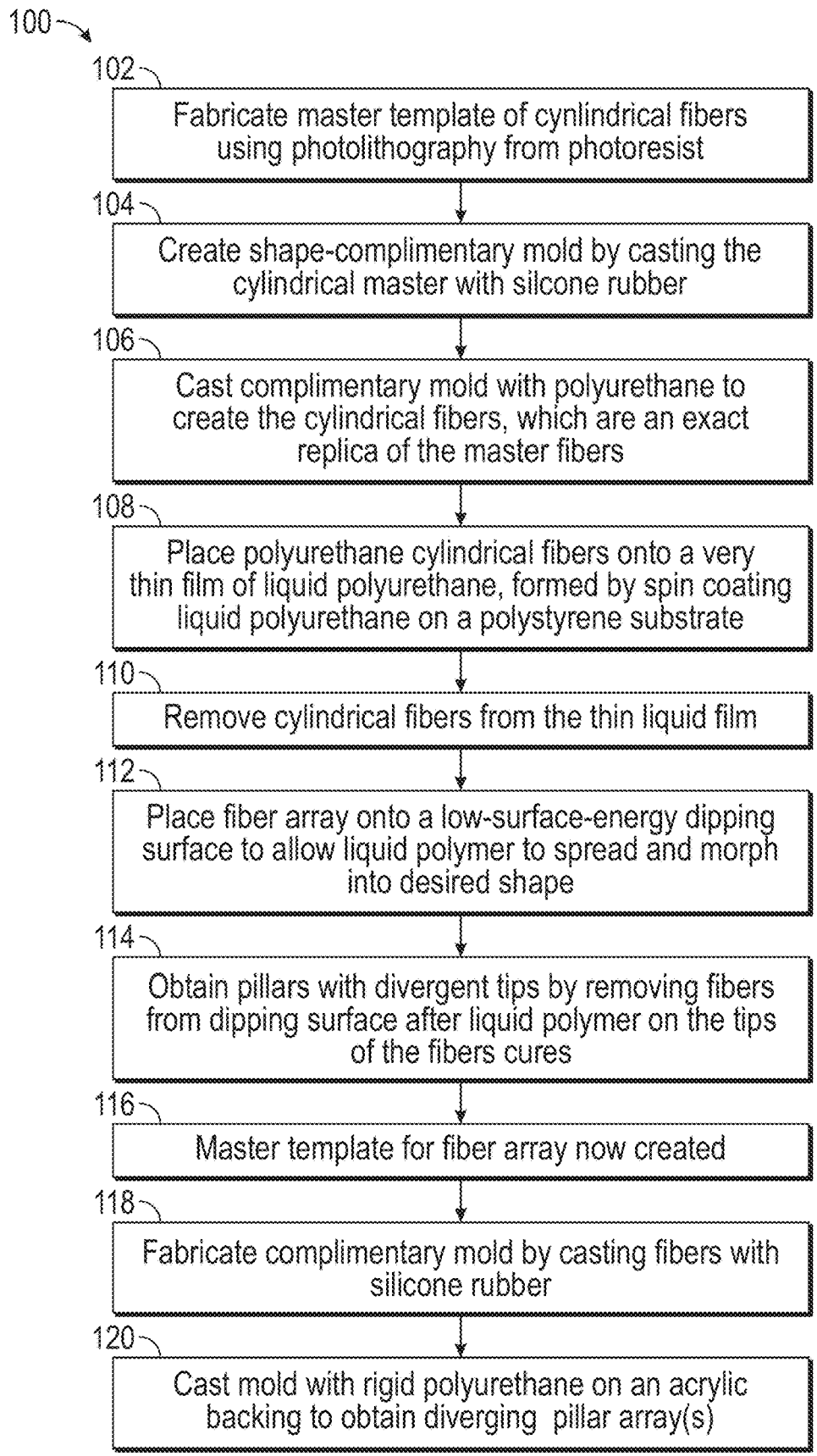
FIG. 7 illustrates a flow chart of operations depicting a method for fiber fabrication in accordance with an example embodiment.

FIG. 7 illustrates a flow chart of operations depicting a method 100 for fiber fabrication in accordance with an example embodiment. The method 100 shown in FIG. 7 can be utilized to configure the disclosed diverging pillar array described herein, which is composed of a group of uniformly distributed cylindrical micropillars. Fiber fabrication (e.g., fabrication of a group of of fibrillar structures) can involve the fabrication of the disclosed microscale coating using a method composed of photolithography, micromolding, and diptransfer printing.

As shown at block 102, a step or operation can be implemented in which a master template of cylindrical fibers is first fabricated using photolithography from photoresist (e.g., SU-8 2100; MicroChem). Next, as shown at block 104, a step or operation can be implemented in which a shape-complementary mold, which features the negative of cylindrical fibers, is manufactured by casting the cylindrical master with silicone rubber (e.g., Mold Max 27T; Smooth-On). Then, as depicted at block 106, a step or operation can be implemented in which the complementary mold is then cast with polyurethane (e.g., ST 3180; BJB Enterprises) to manufacture cylindrical fibers, which are an exact replica of the master fibers.

The second step of the fabrication forms the divergent tip, a feature similar to the shark denticle. As indicated at block 108, a step or operation can be implemented in which the polyurethane cylindrical fibers are placed onto a very thin film of liquid polyurethane, formed by spin coating the liquid polyurethane on a polystyrene substrate, using a spinner (e.g., WS-650 MS; Laurell Technologies). Next, as depicted at block 110, a step or operation can be implemented to remove the cylindrical fibers from the thin liquid film. Note that when the cylindrical fibers are removed from the thin liquid film, they retain some of the liquid polymer on the tip of each individual fiber.

Immediately after this step, as shown at block 112, a step or operation can be implemented in which the fiber array is placed onto a low-surface-energy dipping surface, a polypropylene substrate, allowing the liquid polymer to spread and morph into the desired shape. Thereafter, as illustrated at block 114, a step or operation can be implemented in which the pillars with divergent tips are obtained by removing the fibers from the dipping surface after the liquid polymer on the tips of the fibers cures. This step creates the master template for the fiber array, the result of which is indicated by block 116. As shown next at block 118, a step or operation can be implemented in which a complementary mold is fabricated by casting the fibers with silicone rubber. Then, as described at block 120, a step or operation is implemented, which this mold is cast with a rigid polyurethane (e.g., Crystal Clear 200; Smooth-On) on an acrylic backing to obtain diverging pillar arrays such as those utilized in the disclosed experimental embodiments.

It is understood that the specific order or hierarchy of steps, operations, or instructions in method 100 is an illustration of an exemplary process. Based upon design preferences, it is understood that the specific order or hierarchy of such steps, operation or instructions in such a process as discussed and illustrated herein may be rearranged. The accompanying claims, for example, present elements of various steps, operations or instructions in a sample order, and are not meant to be limited to the specific order or hierarchy presented.

Flow separation and vortex shedding are some of the most common phenomena experienced by bluff bodies under relative motion with the surrounding medium. They often result in a recirculation bubble in regions with adverse pressure gradient, which typically reduces efficiency in vehicles and increases loading on structures. As discussed herein, the ability of an engineered coating to manipulate the large-scale recirculation region was tested in a separated flow at moderate momentum thickness Reynolds number, $Re_\theta=1,200$. The disclosed embodiments demonstrate that the coating, composed of uniformly distributed cylindrical pillars with diverging tips, successfully reduces the size of, and shifts downstream, the separation bubble. Despite the so-called roughness parameter, $k^+\approx 1$, falling within the hydrodynamic smooth regime, the coating is able to modulate the large-scale recirculating motion. Remarkably, this modulation does not induce noticeable changes in the near-wall turbulence levels. Supported with experimental data and theoretical arguments based on the averaged equations of motion, the inventors suggest that the inherent mechanism responsible for the bubble modulation is essentially unsteady suction and blowing controlled by the increasing cross-section of the tips. The coating can be easily fabricated and installed and works under dry and wet conditions, increasing its potential impact on a diverse range of applications.

It should be appreciated that the disclosed coating offers a number of advantages. For example, in addition to facilitating a reducing in noise and vibrations due to the disclosed reduction in the size of the separation bubble, such a coating also facilitates a reduction in drag (i.e., recall that the coating can be implemented in dry or wet conditions). One particular area where the disclosed coating offers an advantage is the field of biofouling. Biofouling or biological fouling involves the accumulation of microorganisms, plants, algae, or animals on wetted surfaces. Such accumulation is referred to as epibiosis when the host surface is another organism and the relationship is not parasitic.

Antifouling is the ability of specifically designed materials and coatings such as the coating described herein to remove or prevent biofouling by any number of organisms on wetted surfaces. Since biofouling can occur almost anywhere water is present, biofouling poses risks to a wide variety of objects such as medical devices and membranes, as well as to entire industries, such as paper manufacturing, food processing, underwater construction, and desalination plants. Thus, the disclosed coating can comprise in some alternative example embodiments, an antifouling coating or material.

Based on the foregoing, it can be appreciated that a number of preferred and alternative example embodiments are disclosed herein. For example, in one embodiment a coating apparatus or device can be configured which includes a coating composed of a plurality of fibrillar structures, wherein each fibrillar structure among the plurality of fibrillar structures is configured with a diverging tip so that the coating reduces a size of and shifts downstream, a separation bubble, and modulates large-scale recirulating motion. The coating can facilitate a reduction in noise and vibrations due to the reduction in the size of the separation bubble. The coating also facilitates a reduction in drag. In an example embodiment, the coating can be configured as an antifouling coating.

Each fibrillar structure among the plurality of fibrillar structures comprises a cylindrical micropillar and the plurality of fibrillar structures comprises a plurality of uniformly distributed cylindrical micropillars. In addition, the coating can be configured to function under a dry condition or a wet condition. Additionally, the coating is configured to mitigate flow separation without a noticeable increase in a production of turblent kinetic energy.

The coating also can be configured in some example embodiments to include a microsurface coating that shifts the separation point downstream and reduces the area of negative flow. In addition, the coating can be configured to rely on the generation of distributed wall-normal perturbations. In another example embodiment, the coating can include a micropillar coating composed of the aforementioned plurality of fibrillar structures.

Figure 8A:
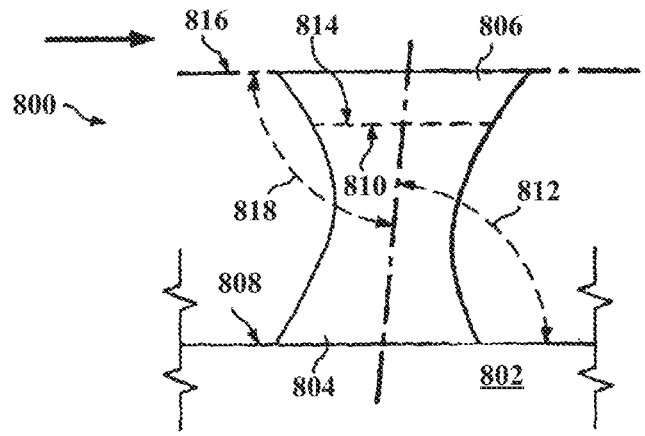
FIG. 8A is a diagram of a fibrillar structure in accordance with one embodiment of the present invention.

Now referring to FIG. 8A, a diagram of a fibrillar structure 800 in accordance with one embodiment of the present invention is shown. The aerodynamic or hydrodynamic wall surface 802 has an array (see FIGS. 8B and 8C) of fibrillar structures 800 disposed on and extending from the wall surface 802. The wall surface 802 can be any shape (e.g., curved) and any portion of wind turbine blade, a propeller, a wing, an airfoil, a flight control surface, a hull of a ship or a submarine, a land-based vehicle, an manned or unmanned aerial vehicle, a pipeline or a stationary structure. Each fibrillar structure 800 has a stalk 804 and a tip 806. The stalk 804 has a first end 808 and a second end 810. The first end 808 of the stalk 804 is attached to the wall surface 802. In addition, the stalk 804 is oriented with respect to the wall surface 802 at a stalk angle 812 between approximately 1 degree and 179 degrees. The tip 806 has a first side 814 and a second side 816. The first side 814 is attached proximate to the second end 810 of the stalk 804. The tip 806 has a larger cross-sectional area than the stalk 804. The second side 816 is a substantially planar surface that is oriented with respect to the stalk 804 at a tip angle 818 between approximately 0 degrees and 90 degrees.

Figure 9A:
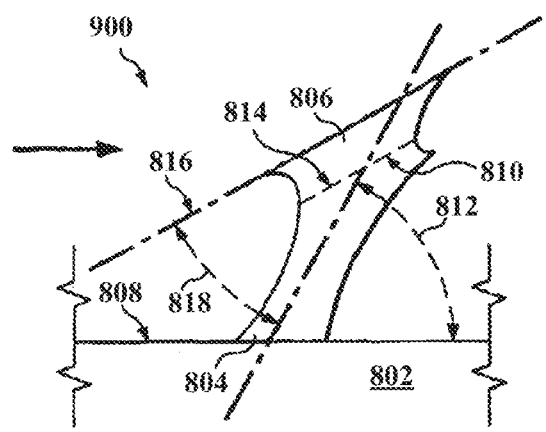
FIG. 9A is a diagram of a fibrillar structure in accordance with another embodiment of the present invention.
Figure 9B:
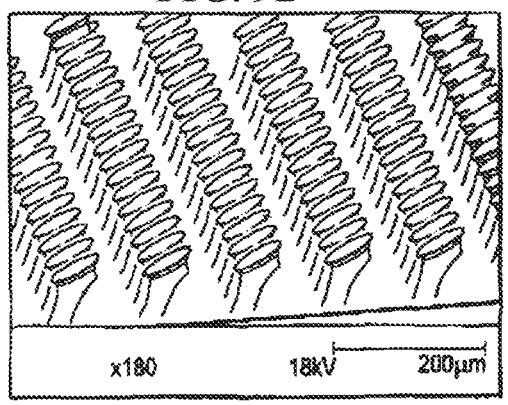
FIGS. 9B, 9C, and 9D are SEM images of an array of the fibrillar structure of FIG. 9A in accordance with another embodiment of the present invention.
Figure 10:
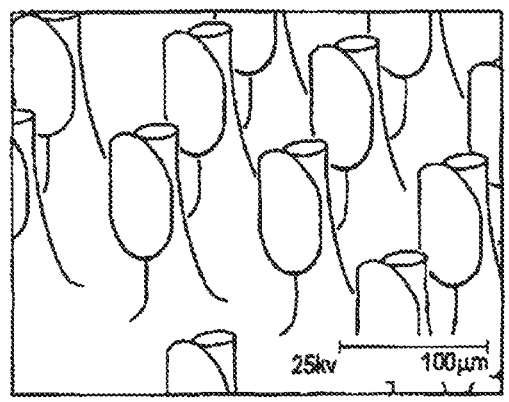
FIG. 10 is a SEM image of an array of fibrillar structures in accordance with yet another embodiment of the present invention.
Figure 9C:
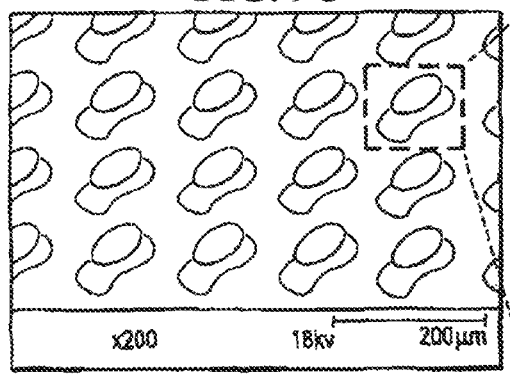
Figure 9D:
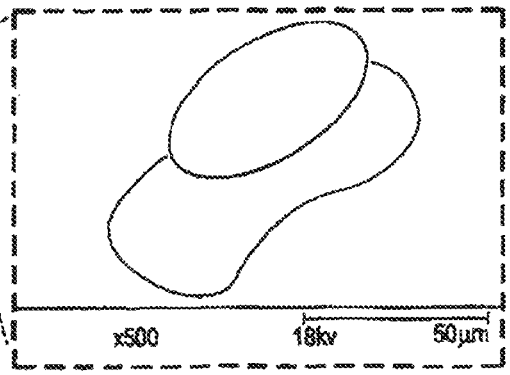

Similarly, FIG. 9A shows a diagram of a fibrillar structure 900 in accordance with one embodiment of the present invention. The aerodynamic or hydrodynamic wall surface 802 has an array (see FIGS. 9B, 9C and 9D) of fibrillar structures 900 disposed on and extending from the wall surface 802. Each fibrillar structure 900 has a stalk 804 and a tip 806. The stalk 804 has a first end 808 and a second end 810. The first end 808 of the stalk 804 is attached to the wall surface 802. In addition, the stalk 804 is oriented with respect to the wall surface 802 at a stalk angle 812 between approximately 1 degree and 179 degrees. The tip 806 has a first side 814 and a second side 816. The first side 814 is attached proximate to the second end 810 of the stalk 804. The tip 806 has a larger cross-sectional area than the stalk 804. The second side 816 is a substantially planar surface that is oriented with respect to the stalk 804 at a tip angle 818 between approximately 0 degrees and 90 degrees.

A cross section of the stalk 804 can be substantially square shaped, rectangular shaped, circular shaped, elliptically shaped, triangular shaped, hexagonally shaped, multi-sided prism shaped or any other desired shape. Likewise, the second side 816 of the tip 806 can be substantially square shaped, rectangular shaped, circular shaped, elliptically shaped, triangular shaped, hexagonally shaped, multi-sided prism shaped or any other desired shape. The stalk 804 and tip 806 can be formed from a single material. Likewise, the wall surface 802, each stalk 804 and each tip 806 can be formed from a single material, such as a silicone rubber, a polyurethane plastic, a thermoplastic, a thermoset, a UV curable material, a polymer or a combination thereof. In addition, the stalk 804 and/or tip 806 can be textured, grooved, ribbed, ridged or otherwise configured to achieve the desired results.

The fibrillar structures 800 and 900 add a controlled, periodic roughness to the surface 802 of airfoils and underwater bodies. The arrays of fibrillar structures 800 and 900 (stalks 804 and tips 806) are manufactured from templates, which are produced utilizing micro/nano-fabrication techniques like photolithography and/or etching processes. These templates are then micro/nano-molded to form the fibrillar structure 800 and 900 geometry. These geometries 800 and 900 reduce turbulence and viscous drag in a more effective fashion than micro-riblets. (see FIGS. 8B, 8C, 9B, 9C and 9D).

The developed fabrication technique allows for control over the diameter (10 nm and up), length (10 nm and up), cross-sections (including but not limited to square, rectangle, circle, ellipse, triangle, hexagon, multi-sided prism or any other desired shape) and fiber spacing (10 nm and up, square, hexagonal, random or other packing configuration) as seen in FIGS. 8B, 8C, 9B, 9C, 9D and 10. In addition, the alignment of the stalk 804 and the tip 806 can be controlled separately from 0° to 90° (most often 0° to 45°) which aids in creating surfaces with directional drag properties. For example, each stalk may have a stalk diameter of approximately 10 nm to 1000 μm, a length of approximately 10 nm to 1000 μm, each tip may have a tip diameter of approximately 10 nm to 2000 μm, and a center of each stalk is separated from a center of an adjacent stalk by approximately 10 nm to 5000 μm. In addition, multiple arrays of fibrillar structures having one or more of a different stalk angle, a different stalk shape, a different stalk length, a different stalk diameter, a different tip angle, a different tip shape, a different tip length, a different tip diameter, a different spacing, a different packing configuration or a different backing layer thickness can be used on a single surface.

Moreover, it is possible to create fiber arrays with heterogeneous fiber geometry such that the individual fibers forming the array have varying cross-sectional shape, diameter, and spacing. This tuning ability could provide optimal performance for transitional flows. This technology relies on a micromolding process and uses readily available commercial materials. In one embodiment of the invention, polyurethane plastics can be used to form the microfiber structures. In another embodiment of the invention, silicone rubbers can be used to form the microfiber structures. In other embodiments of the invention, any moldable material compatible with the manufacturing process can be used to form the micro- and/or nano-patterned aerodynamic/hydrodynamic surface, including, but not limited to:

A. Thermosets:
  i. Formaldehyde Resins (PF, RF, CF, XF, FF, MF, UF, MUF);
  ii. Polyurethanes (PU);
  iii. Unsaturated Polyester Resins (UP);
  iv. Vinylester Resins (VE), Phenacrylate Resins, Vinylester Urethanes (VU);
  v. Epoxy Resins (EP);
  vi. Diallyl Phthalate Resins, Allyl Esters (PDAP);
  vii. Silicone Resins (Si); and
  viii. Rubbers: R-Rubbers (NR, IR, BR, CR, SBR, NBR, NCR, IIR, PNR, SIR, TOR, HNBR), M-Rubbers (EPM, EPDM, AECM, EAM, CSM, CM, ACM, ABM, ANM, FKM, FPM, FFKM), O-Rubbers (CO, ECO, ETER, PO), Q-(Silicone) Rubber (MQ, MPQ, MVQ, PVMQ, MFQ, MVFQ), T-Rubber (TM, ET, TCF), U-Rubbers (AFMU, EU, AU) Text, and Polyphosphazenes (PNF, FZ, PZ)

B. Thermoplastics
  i. Polyolefins (PO), Polyolefin Derivates, and Copolymers: Standard Polyethylene Homo- and Copolymers (PE-LD, PE-HD, PE-HD-HMW, PE-HD-UHMW, PE-LLD), Polyethylene Derivates (PE-X, PE+PSAC), Chlorinated and Chloro-Sulfonated PE (PE-C, CSM), Ethylene Copolymers (ULDPE, EVAC, EVAL, EEAK, EB, EBA, EMA, EAA, E/P, EIM, COC, ECB, ETFE, Polypropylene Homopolymers (PP, H-PP);
  ii. Polypropylene Copolymers and Derivates, Blends (PP-C, PP-B, EPDM, PP+EPDM);
  iii. Polybutene (PB, PIB);
  iv. Higher Poly-α-Olefins (PMP, PDCPD);
  v. Styrene Polymers: Polystyrene, Homopolymers (PS, PMS), Polystyrene, Copolymers, Blends, Polystyrene Foams (PS-E, XPS);
  vi. Vinyl Polymers: Rigid Polyvinylchloride Homopolymers (PVC-U), Plasticized (Soft) Polyvinylchloride (PVC-P), Polyvinylchloride: Copolymers and Blends, Polyvinylchloride: Pastes, Plastisols, Organosols, Vinyl Polymers, other Homo- and Copolymers (PVDC, PVAC, PVAL, PVME, PVB, PVK, PVP);
  vii. Fluoropolymers: FluoroHomopolymers (PTFE, PVDF, PVF, PCTFE), Fluoro Copolymers and Elastomers (ECTFE, ETFE, FEP, TFEP, PFA, PTFEAF, TFEHFPVDF (THV), [FKM, FPM, FFKM]);
  viii. Polyacryl- and Methacryl Copolymers;
  ix. Polyacrylate, Homo- and Copolymers (PAA, PAN, PMA, ANBA, ANMA);
  x. Polymethacrylates, Homo- and Copolymers (PMMA, AMMA, MABS, MBS);
  xii. Polymethacrylate, Modifications and Blends (PMMI, PMMA-HI, MMA-EML Copolymers), PMMA+ABS Blends;
  xii. Polyoxymethylene, Polyacetal Resins, Polyformaldehyde (POM): Polyoxymethylene Homo- and Copolymers (POM-H, POM-Cop.), Polyoxymethylene, Modifications and Blends (POM+PUR);
  xiii. Polyamides (PA): Polyamide Homopolymers (AB and AA/BB Polymers) (PA6, 11, 12, 46, 66, 69, 610, 612, PA 7, 8, 9, 1313, 613), Polyamide Copolymers, PA 66/6, PA 6/12, PA 66/6/610 Blends (PA+: ABS, EPDM, EVA, PPS, PPE, Rubber), Polyamides, Special Polymers (PA NDT/INDT [PA 6-3-t], PAPACM 12, PA 6-I, PA MXD6 [PARA], PA 6 T, PA PDA-T, PA 6-6-T, PA 6-G, PA 12-G, TPA-EE), Cast Polyamides (PA 6-C, PA 12-C), Polyamide for Reaction Injection Molding (PA-RIM), Aromatic Polyamides, Aramides (PMPI, PPTA);
  xiv. Aromatic (Saturated) Polyesters: Polycarbonate (PC), Polyesters of Therephthalic Acids, Blends, Block Copolymers, Polyesters of Aromatic Diols and Carboxylic Acids (PAR, PBN, PEN);
  xv. Aromatic Polysulfides and Polysulfones (PPS, PSU, PES, PPSU, PSU+ABS): Polyphenylene Sulfide (PPS), Polyarylsulfone (PSU, PSU+ABS, PES, PPSU);
  xvi. Aromatic Polyether, Polyphenylene Ether (PPE), and PPE Blends;
  xvii. Aliphatic Polyester (Polyglycols) (PEOX, PPDX, PTHF);
  xviii. Aromatic Polyimide (PI): Thermosetting Polyimide (PI, PBMI, PBI, PBO, and others), Thermoplastic Polyimides (PAI, PEI, PISO, PMI, PMMI, PESI, PARI);
  xix. Liquid Crystalline Polymers (LCP);
  xx. Ladder Polymers: Two-Dimensional Polyaromates and Heterocyclenes: Linear Polyarylenes, Poly-p-Xylylenes (Parylenes), Poly-p-Hydroxybenzoate (Ekonol), Polyimidazopyrrolone, Pyrone, Polycyclone;
  xxi. Biopolymers, Naturally Occurring Polymers and Derivates: Cellulose- and Starch Derivates (CA, CTA, CAP, CAB, CN, EC, MC, CMC, CH, VF, PSAC), 2 Casein Polymers, Casein Formaldehyde, Artificial Horn (CS, CSF), Polylactide, Polylactic Acid (PLA), Polytriglyceride Resins (PTP®);

xxii. Photodegradable, Biodegradable, and Water Soluble Polymers;
xxiii. Conductive/Luminescent Polymers;
xxiv. Aliphatic Polyketones (PK);
xxv. Polymer Ceramics, Polysilicooxoaluminate (PSIOA);
xxvi. Thermoplastic Elastomers (TPE): Copolyamides (TPA), Copolyester (TPC), Polyolefin Elastomers (TPO), Polystyrene Thermoplastic Elastomers (TPS), Polyurethane Elastomers (TPU), Polyolefin Blends with Crosslinked Rubber (TPV), and Other TPE, TPZ; and
xxvii. Other materials known to those familiar with the art.

This flexibility in material selection facilitates the choice of material not only for optimizing the drag reduction but also for meeting the demanding structural or environmental requirements for a wide range of specific commercial applications. The low commodity cost of these moldable materials, the inexpensive manufacturing processes which can produce the micro- and/or nano-patterned arrays in large volumes at high speeds, and the scalability of the fabrication technique make this technology commercially viable. Areas of viscous drag reducing microfibers can be made through molding processes including vacuum-assisted manual or automated batch or continuous roller-based processes. Other molding processes which may be used to produce these microfibers include, but are not limited to:

A. Injection molding: Injection over molding, Co-injection molding, Gas assist injection molding, Tandem injection molding, Ram injection molding, Micro-injection molding, Vibration assisted molding, Multiline molding, Counter flow molding, Gas counter flow molding, Melt counter flow molding, Structural foam molding, Injection-compression molding, Oscillatory molding of optical compact disks, Continuous injection molding, Reaction injection molding (Liquid injection molding, Soluble core molding, Insert molding), and Vacuum Molding;

B. Compression molding: Transfer molding, and Insert molding;

C. Thermoforming: Pressure forming, Laminated sheet forming, Twin sheet thermoforming, and Interdigitation;

D. Casting: Encapsulation, Potting, and impregnation;

E. Coating Processes: Spray coating, Powder coatings, Vacuum coatings, Microencapsulation coatings, Electrode position coatings, Floc coatings, and Dip coating;

F. Blow molding: Injection blow molding, Stretch blow molding, and Extrusion blow molding;

G. Vinyl Dispersions: Dip molding, Dip coatings, Slush molding, Spray coatings, Screened inks, and Hot melts;

H. Composite manufacturing techniques involving molds: Autoclave processing, Bag molding, Hand lay up, and Matched metal compression; and I. Other processes known to those familiar with the art.

Figure 11:
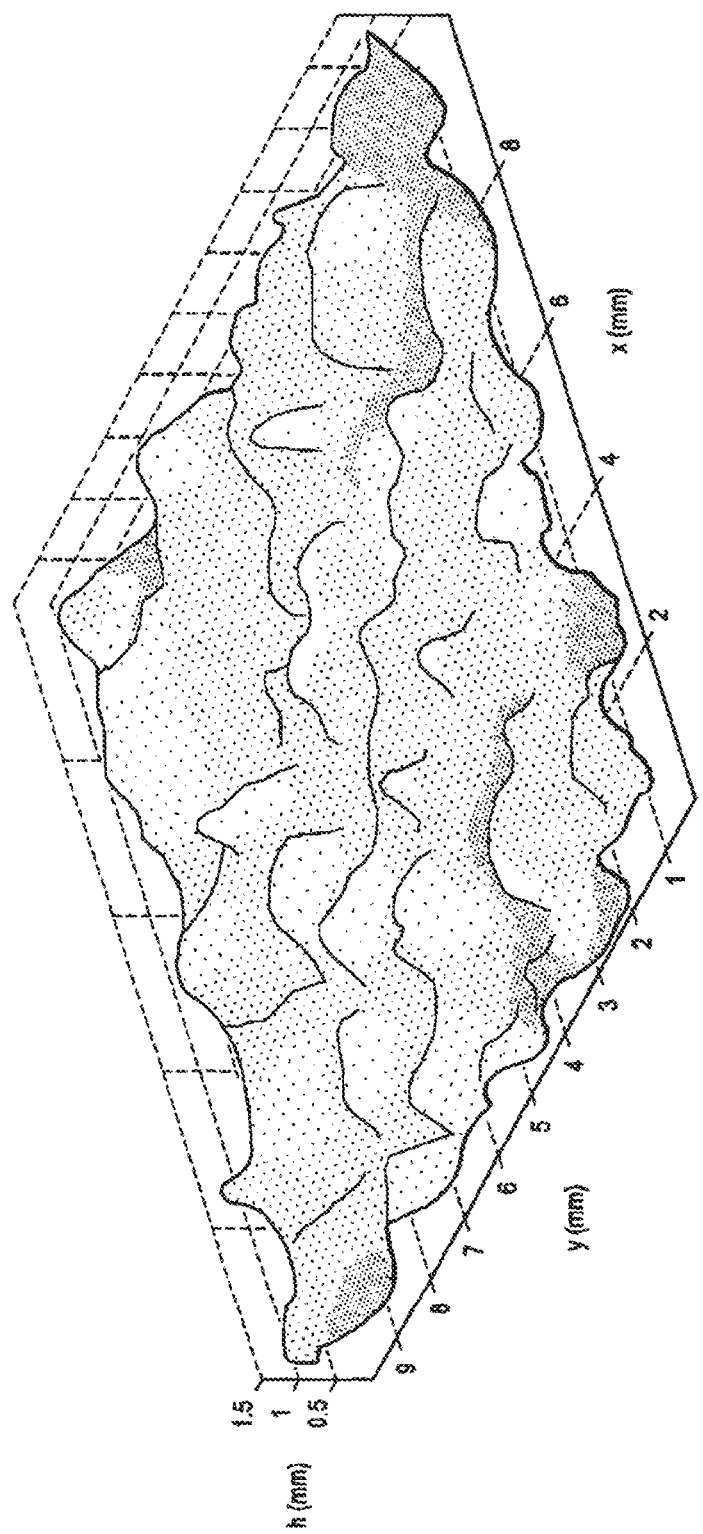
FIG. 11 is a graph showing a roughness height distribution of a sand paper type in accordance with one embodiment of the present invention.
Figure 12:
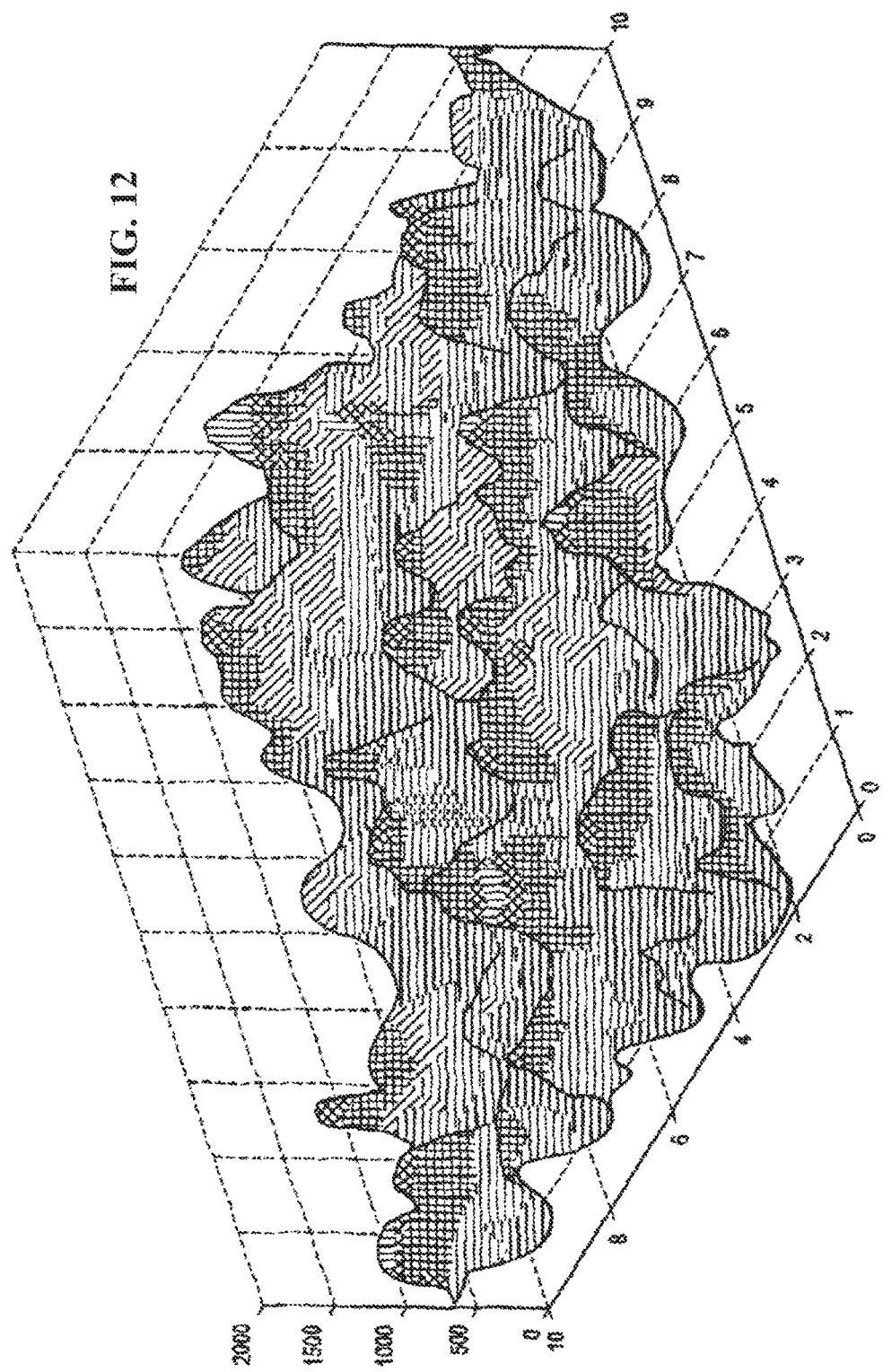
FIG. 12 is a graph showing a roughness height distribution in the mesh in accordance with another embodiment of the present invention.
Figure 13:
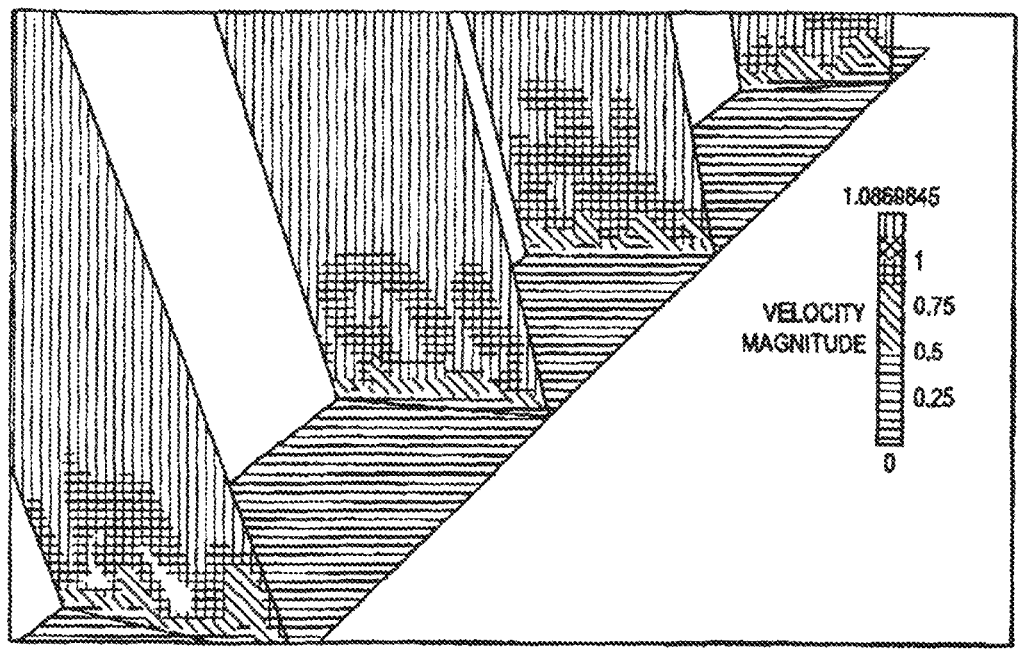
FIG. 13 is an image showing the iso-contours of instantaneous velocity in accordance another embodiment of the present invention.
Figure 14A:
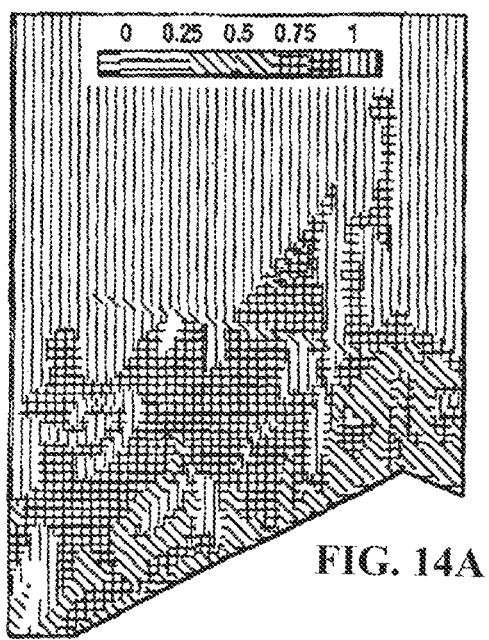
FIGS. 14A and 14B are images showing the iso-contours of instantaneous temperature in smooth surface and a rough surface respectively in accordance with another embodiment of the present invention.
Figure 14B:
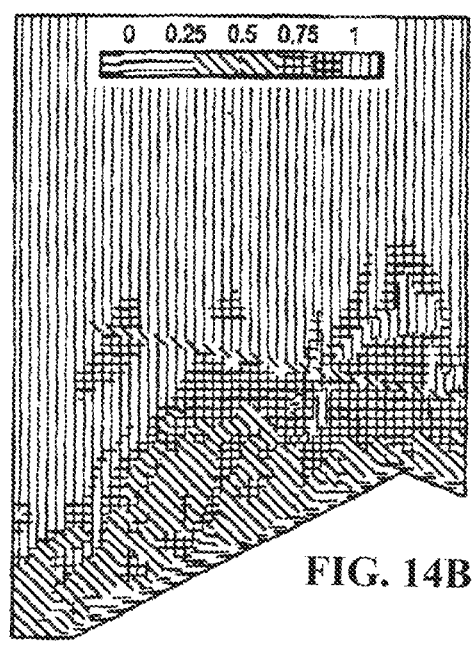

For the numerical investigation, Direct Numerical Simulations (DNS) of turbulent spatially-developing boundary layers under fibrillar surfaces are performed and compared to experimental results of the airfoil in the wind tunnel. The turbulent inflow information is generated based on the dynamic multi-scale approach proposed by Araya et al. [4-6] plus a new methodology for mapping high-resolution topographical surface data into the computational mesh. A major advantage of the dynamic multi-scale procedure is that drastically reduces the length of the computational domain; therefore, higher Reynolds numbers can be computed. The numerical code for performing direct numerical simulations of the full Navier-Stokes equations for incompressible flows is known as PHASTA (Parallel Hierarchic Adaptive Stabilized Transient Analysis). PHASTA is based on the Finite Element method with a Streamline Upwind Petrov-Galerkin (SUPG) stabilization. In order to characterize the surface roughness, a new subroutine has been added to the PHASTA code. The subroutine employs a "displaced-boundary" method. It works by taking the no-slip condition, which is originally assigned to the bottom wall of the computational domain, and displacing it to the height of the roughness element at the corresponding node. An application of the developed displaced-boundary method [7] is shown in FIGS. 11 and 12 for a topographical data of a surface 24-grit sand grain surface taken from experiments by [8]. FIG. 13 depicts iso-contours of instantaneous velocity in a rough surface, a clear thickening of the turbulent boundary layer can be observed due to the presence of roughness. In FIGS. 14A and 14B, iso-contours of instantaneous temperature in smooth and rough surfaces can be observed. The main effect of rough walls on the thermal field has been identified as a mixing enhancement.

Figure 8B:
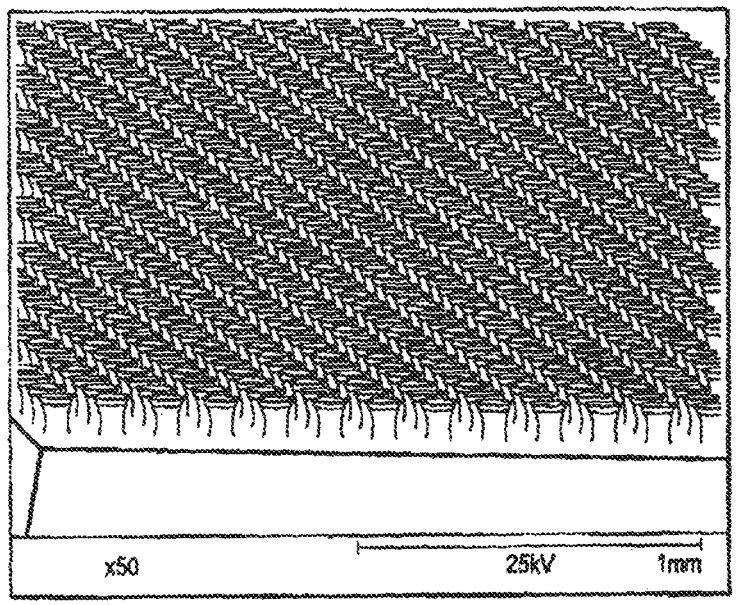
FIGS. 8B and 8C are scanning electron microscope (SEM) images of an array of the fibrillar structures of FIG. 8A in accordance with one embodiment of the present invention.
Figure 8C:
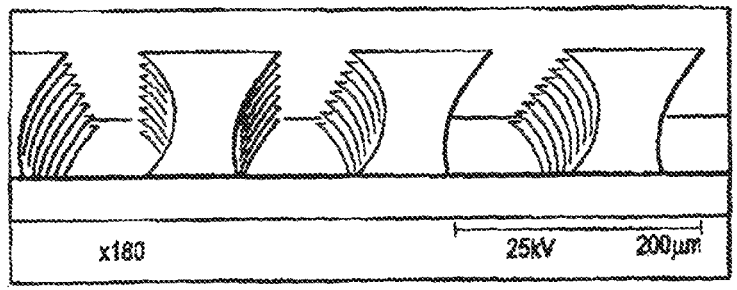
Figure 15A:
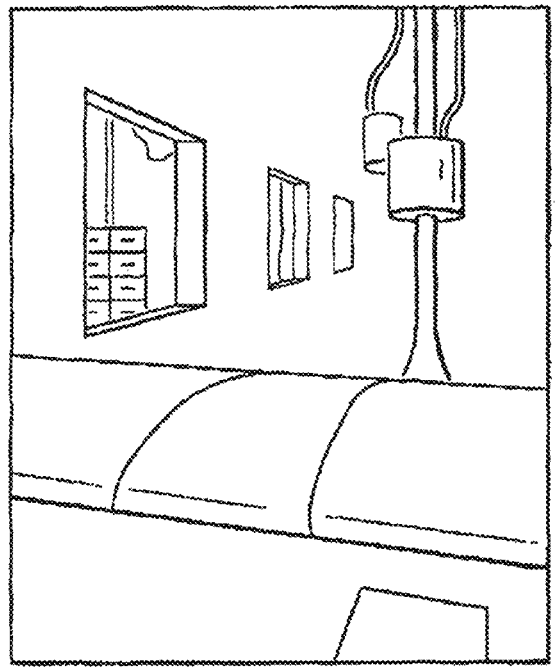
FIGS. 15A and 15B are images of an airfoil with microfibers in a wind tunnel and a fabrication of S089, respectively, in accordance with one embodiment of the present invention.
Figure 15B:
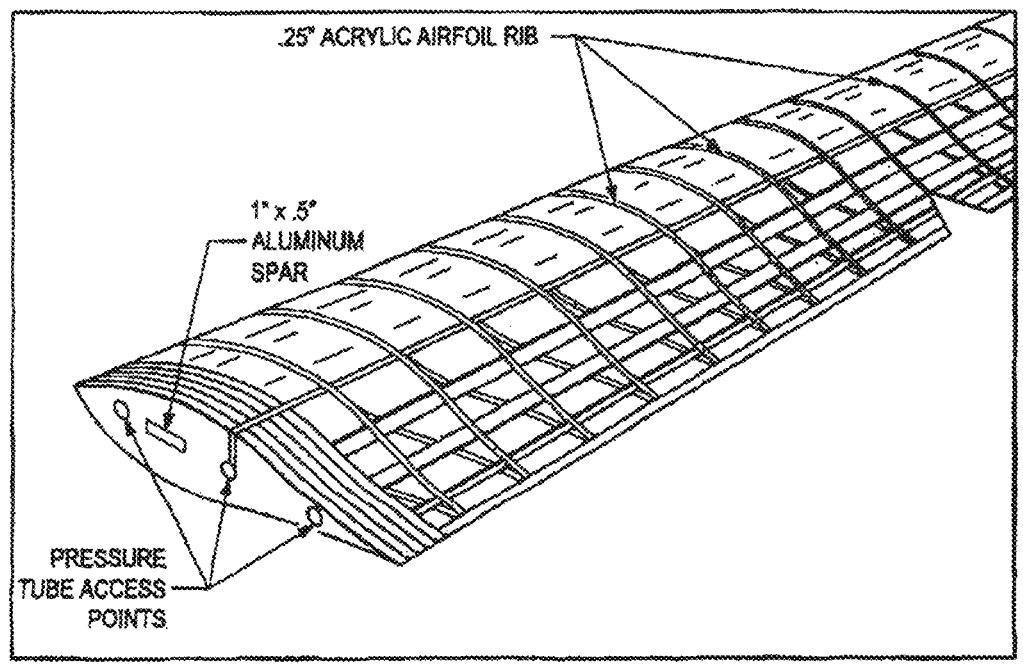
Figure 16A:
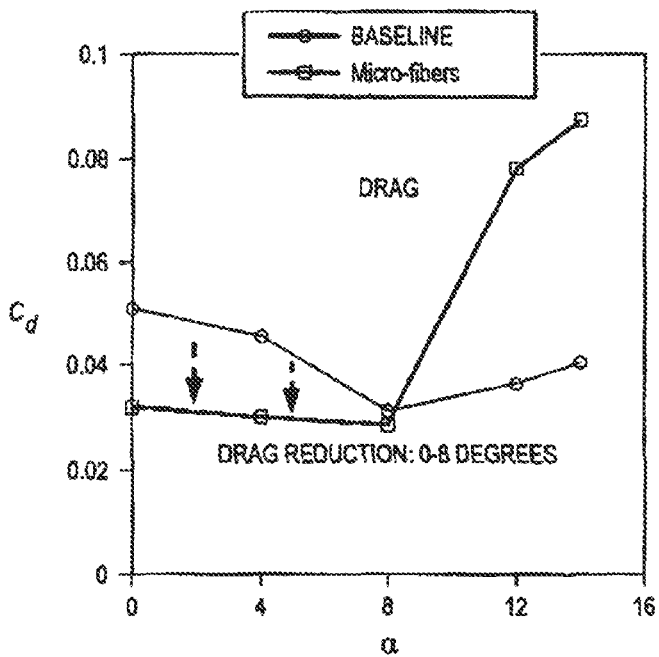
FIGS. 16A and 16B are graphs showing the drag coefficient and velocity deficient, respectively, in accordance with one embodiment of the present invention.
Figure 16B:
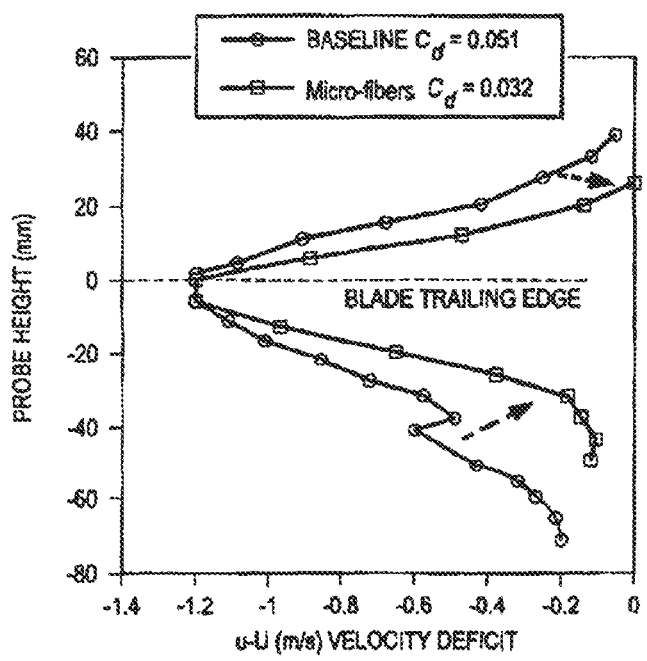

To measure the effect of the fibrillar structures on aerodynamic properties, wind tunnel experiments using pressure tap and wake measurements were performed in a wind tunnel by covering an airfoil surface with the same bio-inspired fibrillar film illustrated in FIG. 8B. Schematics of the airfoil setup are shown in FIGS. 15A and 15B. The dimensions of individual fibers in the studied array are 50 μm in stalk diameter, 100 μm in length, 100 μm in tip diameter. Also the fibers were arranged in a square packing formation where the distance between the centers of neighboring fibers is 120 μm. Notice from FIG. 15A that only the centerline of the airfoil was covered with the film. Results obtained by wake measurements and pressure tap measurements suggest significant drag reduction. A drag reduction up to 38% was observed at 4-degree angle of attack (see FIG. 16A). The velocity deficit in the wake was measured for the baseline (un-treated surface) and for the micro-fibers surface as depicted in FIG. 16B. To the best of the inventors' knowledge, these values are the highest obtained among passive systems used for drag reduction.

To validate and expand upon these results, direct measurements of lift and drag using a dual-cell force balance were also performed to measure lift and drag forces directly using a larger airfoil covered entirely with the same micro fibrillar film (shown in FIG. 8B) used in the pressure experiments of FIGS. 15A and 15B. The experiments were conducted in a zero pressure gradient wind tunnel with a cross-section of 1.75 m×1.25 m. The turbulent intensity during this study was characterized at 1%. Measurements were conducted at six free-stream velocities, 2.5, 5, 7.5, 10, 15 and 20 m/s. Fort each flow condition, lift and drag were measured at 26 angles of attack ranging from −4° to 20° at increments of 1°. Substantial data has been collected to assess drag reduction and aerodynamic performance of baseline case and wing covered with microfilm.

Figure 17A:
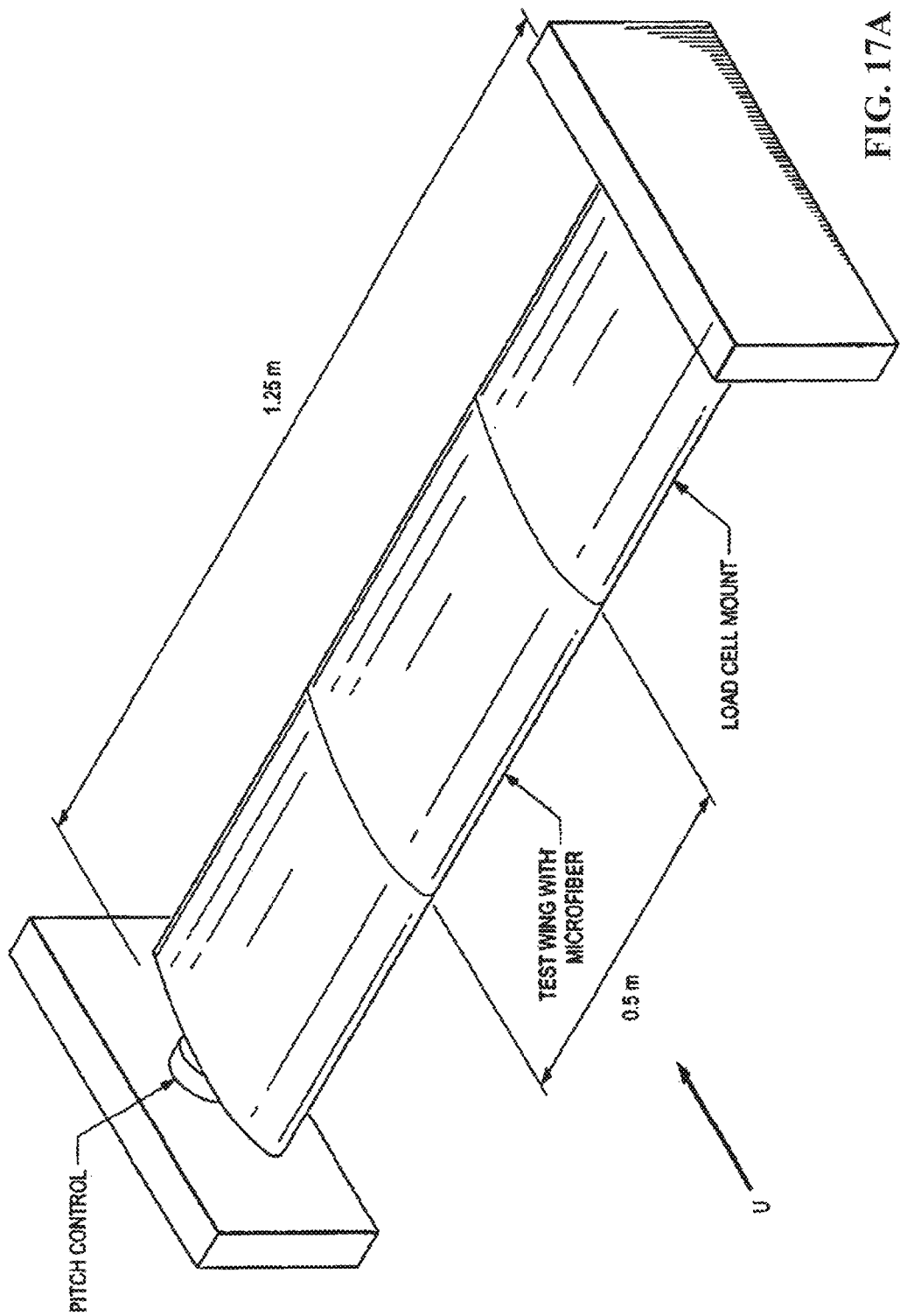
FIGS. 17A, 17B, 17C, and 17D are images showing the experimental setup, wing schematic, wing side view and load cell schematic, respectively, in accordance with one embodiment of the present invention.
Figure 17B:
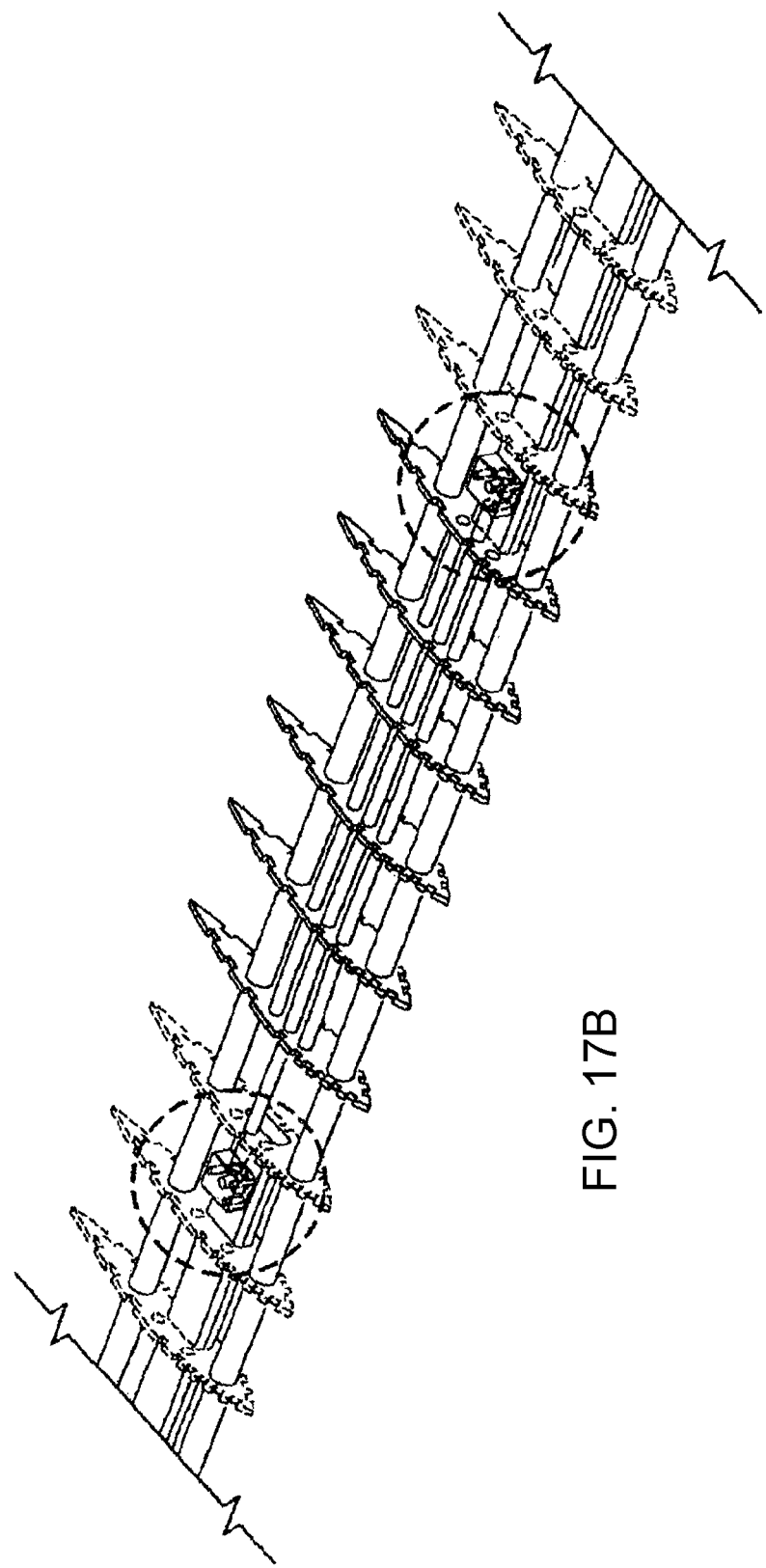
Figure 17C:
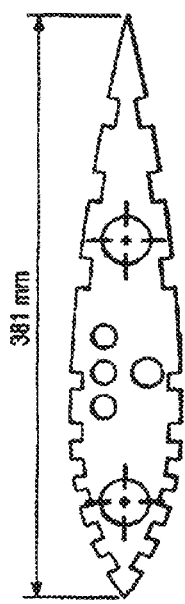
Figure 17D:
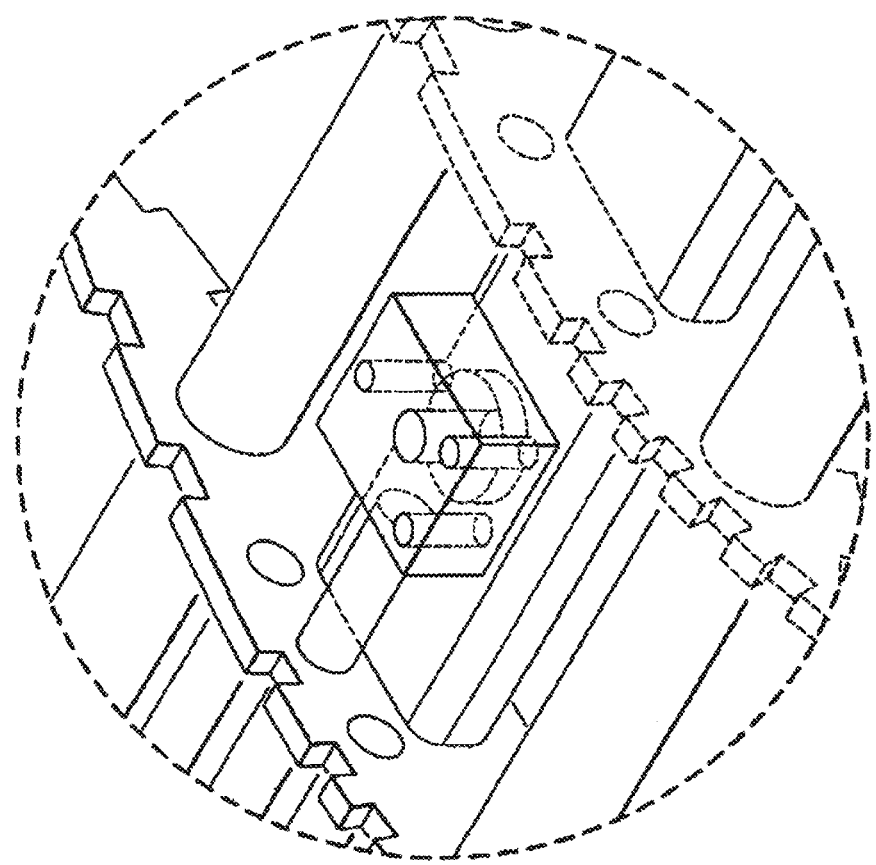

For this set of experiments, a new airfoil with a total wing span of 1.75 m and a cord length of 0.381 m was fabricated which consists of three sections (FIGS. 17A, 17B and 17C): two stationary sections with span of 0.62 m hosting two 6-axis load cell (Mini 40, ATI), and a center test section with a span of 0.5 m. Two load cells are mechanically grounded on two stainless steel rods (with diameters of 1") (see FIG. 17D). This unique dual-load cell design was chosen to improve measurement accuracy and to eliminate the "ghost" forces often associated with the single-cell sting mount balance system. The newly built force balance has been calibrated by performing drag and lift on a smooth cylinder. The drag coefficient is measured at 0.972 and lift force around 0.02N. With careful error analysis, the error in force measurement is ~0.02N or ~0.5% of full scale. Two surfaces have been tested, i.e. a smooth polyurethane surface as the baseline and surface "coated" with microfilm with 50 $\Box$m (top)×100 $\Box$m (height) micro-fibrillar structure shown in FIG. 8B. Note that the entire test section has been "coated" with the microfilm (white sheet in FIG. 17A). This demonstrates that the manufacturing capability to produce micro-fiber arrays has reached large application scale.

Figure 18A:
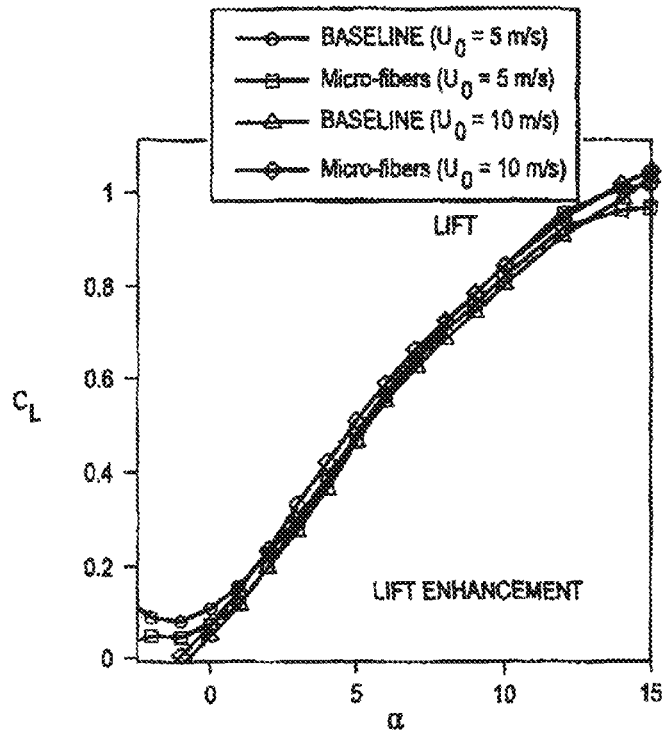
FIGS. 18A, 18B and 18C are graphs showing the lift enhancement, drag reduction lift to drag coefficient in accordance with one embodiment of the present invention.
Figure 18B:
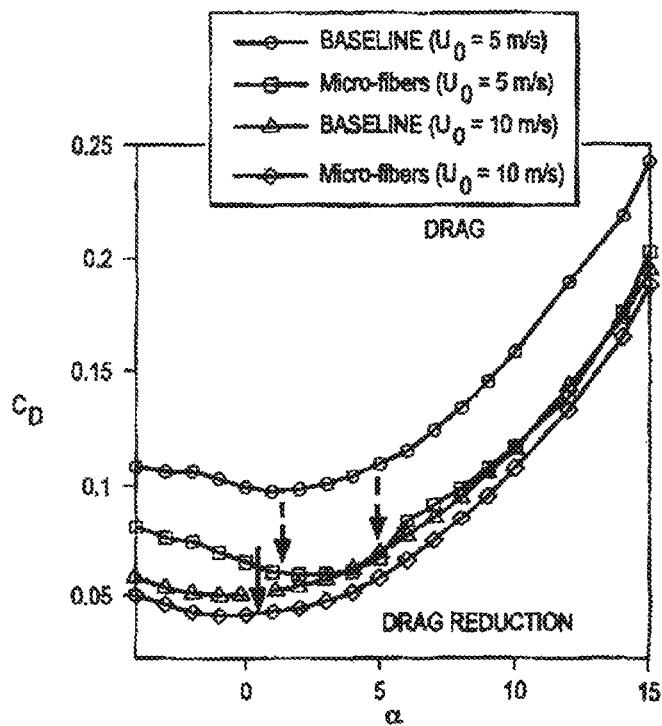
Figure 18C:
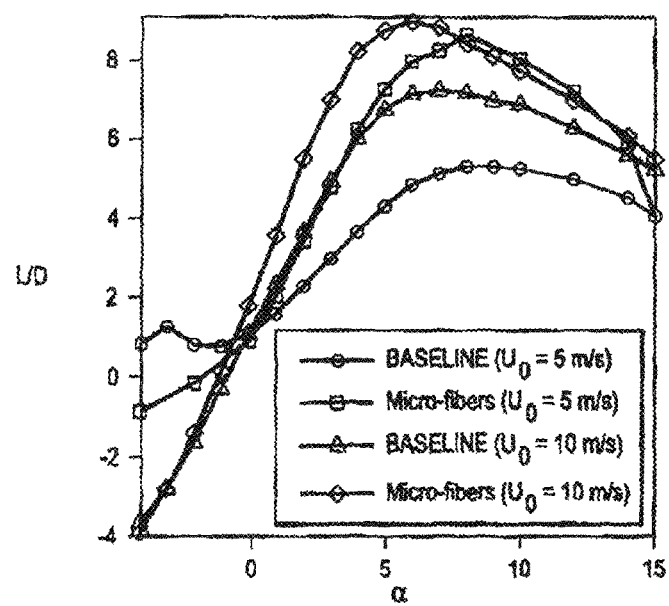

As shown in FIGS. 18A, 18B and 18C, the micro-fibrillar surface provides 40% and 33% of drag reduction at 5 m/s ($[Re]\_c=(U\_0\ C)/v$ based on cord length is 2×105) and 10 m/s (Rec=4×105), respectively. The wing has a span of 0.5 m and cord of 0.381 m. The symbols indicate baseline and airfoil with micro-fibers as circle and square respectively. The color represents measurements taken at various free stream velocities (Red=5 m/s; Green=10 m/s). The rate of reduction decreases with increasing Re (not shown). It may suggest that increasing surface roughness as boundary transition to turbulence. It is also noted that the rate increases initially as angles of attack increases and peaks at ~4 after which the rate decreases monotonically. The microfilm surface also impacts the lift generation although the effect is much less pronounced. One can observed that the lift increases with micro-fibers at 5 m/s while it decreases slightly for 10 m/s free stream velocity. In addition, lift-to-dag ratio (L/D) is enhanced with micro-fiber coated airfoil for all speeds and angles of attack higher than 0 degrees. The L/D shows improvement for all Re(s) at angle of attack of 0 and above. Drag reduction with the micro-fiber coated airfoil is similar and hovers around 30%-40% for both the force balance and wake/surface pressure experiments. This match provides added confidence on the data and the groundbreaking nature of this technology and its potential application for drag reduction for aerodynamic and hydro-dynamic applications.

Results obtained both by the wake/surface pressure measurement experiment and the force balance measurement experiment show significant drag reduction for the micro-fiber coated airfoil when compared with the uncoated airfoil data. The implications of this technology are groundbreaking in that it improves efficiency significantly leading to higher conversion efficiencies in wind turbines, drastic reduction in fuel consumption in ground and aerospace transportation systems with potential applications in underwater systems. Moreover, this technology can be used in other applications. For example, many additives, which are expensive and pollutants, are added to fracking fluids to reduce the pipeline fluid friction. This technology can both eliminate these additives and achieve greater drag reduction. In another example, this technology can reduce the loading on wind-contacting stationary surfaces (e.g., bridges, construction cranes, etc.), thereby increasing their lifespan and reducing maintenance expenses. Accordingly, this technology can be applied to many different applications, including but not limited to: wind turbines, automobiles, trucking, civilian and military manned aerospace, civilian and military unmanned aerial vehicles (UAVs), other ground transportation (e.g., trains, etc.), other aerospace transportation, civilian an military ship and submarine hulls, pipelines (e.g., oil, gas, fracking, water, etc.), and wind contacting surfaces where minimal loading is important (e.g., bridges, buildings, construction cranes, etc.).

It will be understood by those of skill in the art that although preferred embodiments of the present invention have been described in detail, it will be understood by those skilled in the art that various modifications can be made therein without departing from the spirit and scope of the invention as set forth in the appended claims.

REFERENCES

[1] B. D. Dean, and B. Bhushan, "Shark-skin surfaces for fluid-drag reduction in turbulent flow: a review," Phil. Trans. R. Soc. A 368: 4775-4806, 2010.
[2] B. Aksak, M. Murphy, and M. Sitti, "Gecko Inspired Micro-fibrillar Adhesives for Wall Climbing Robots on Micro/Nanoscale Rough Surfaces," ICRA, Pasadena, CA, 2008.
[3] M. Murphy, B. Aksak, and M. Sitti, "Gecko-Inspired Directional and Controllable Adhesion," Small, 5(2):170-175, 2008.
[4] Araya, G., Jansen, K. and Castillo, L., "Inlet condition generation for spatially-developing turbulent boundary layers via multi-scale similarity", J. of Turbulence, 10, No. 36, 133, 2009.
[5] Araya, G., Castillo, L., Meneveau, C. and Jansen, K., "A dynamic multi-scale approach for turbulent inflow boundary conditions in spatially evolving flows", JFM, 670, 518605, 2011.
[6] Araya, G. and Castillo, L., "DNS of turbulent thermal boundary layers up to Re6=2300", International Journal of Heat and Mass Transfer, Volume 55, Issues 15-16, pp 4003-4019, 2012.
[7] J. Cardillo, Y Chen, G. Araya, O. Sahni, K. Jansen, and L. Castillo, "DNS of a Turbulent Boundary Layer with Surface Roughness", JFM (under review), 2012.
[8] B. Brzek and R. B. Cal and G. Johansson and L. Castillo, "Transitionally rough zero pressure gradient turbulent boundary layers", Experiments in Fluids, 44, 115124, 2008.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method comprising:
    forming a plurality of stalks in a first processing step; and
    forming a plurality of diverging tips on the stalks during a second processing step,
    wherein the stalks and the diverging tips form a coating comprising a plurality of fibrillar structures,
    wherein the fibrillar structures of the coating reduce a size of and shifts downstream, a separation bubble, and modulates large-scale recirculating motion, and
    wherein said coating facilitates a reduction in noise and vibrations due to said reduction in said size of said separation bubble, and further facilitates a reduction in drag.

* * * * *